(12) United States Patent
Aghili et al.

(10) Patent No.: US 9,497,566 B2
(45) Date of Patent: Nov. 15, 2016

(54) EFFICIENT SIGNALING FOR MACHINE TYPE COMMUNICATION

(75) Inventors: Behrouz Aghili, Commack, NY (US); Joseph M. Murray, Schwenksville, PA (US); Jean-Louis Gauvreau, Montreal (CA); Ana Lucia A. Pinheiro, Breinigsville, PA (US); Diana Pani, Montreal (CA); Lujing Cai, Morganville, PA (US); Sylvie Gomes, Douglaston, NY (US); Christopher Cave, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 213 days.

(21) Appl. No.: 13/636,508

(22) PCT Filed: Mar. 23, 2011

(86) PCT No.: PCT/US2011/029550
§ 371 (c)(1),
(2), (4) Date: Dec. 21, 2012

(87) PCT Pub. No.: WO2011/119680
PCT Pub. Date: Sep. 29, 2011

(65) Prior Publication Data
US 2013/0100895 A1 Apr. 25, 2013

Related U.S. Application Data

(60) Provisional application No. 61/329,392, filed on Apr. 29, 2010, provisional application No. 61/320,610, filed on Apr. 2, 2010, provisional application No. 61/316,596, filed on Mar. 23, 2010.

(51) Int. Cl.
*H04W 4/00* (2009.01)
*H04W 72/00* (2009.01)
*H04W 4/20* (2009.01)

(52) U.S. Cl.
CPC .............. *H04W 4/005* (2013.01); *H04W 4/00* (2013.01); *H04W 4/20* (2013.01)

(58) Field of Classification Search
None
See application file for complete search history.

(56) References Cited

U.S. PATENT DOCUMENTS 5,818,871 A 10/1998 Blakeney, II
8,711,751 B2 * 4/2014 Mueck et al. ................. 370/312
(Continued)

FOREIGN PATENT DOCUMENTS

EP 2182328 A1 5/2010
JP 2007531359 A 11/2007
(Continued)

OTHER PUBLICATIONS

3rd Generation Partnership Project (3GPP), TS 22.368 V2.0.0, "3rd Generation Partnership Project; Technical Specification Group Services and System Aspects; Service requirements for machine-type communications; Stage 1 (Release 10)", Mar. 2010, 22 pages.

(Continued)

*Primary Examiner* — Eunsook Choi
(74) *Attorney, Agent, or Firm* — Condo Roccia Koptiw LLP

(57) ABSTRACT

Disclosed herein are embodiments for Machine Type Communication (MTC). The techniques disclosed may reduce signaling by transmitting MTC data over control planes and avoiding a full cycle of connection procedures typically required for transmission. MTC data may be directly appended to a control plane message, in addition, in order to reduce the signaling load, a WTRU may autonomously release the connection without being told, by the network. Techniques may be used to indicate a network provider's machine type communication (MTC) capability. The MTC services or capabilities that may be provided by a respective network operator may be communicated to a WTRU.

14 Claims, 14 Drawing Sheets

(56) References Cited

U.S. PATENT DOCUMENTS

| | | | |
|---|---|---|---|
| 8,744,483 B2* | 6/2014 | Lee et al. | 455/456.1 |
| 2001/0015964 A1 | 8/2001 | Fuchisawa | |
| 2005/0119008 A1* | 6/2005 | Haumont | 455/456.1 |
| 2006/0264217 A1 | 11/2006 | Shaheen | |
| 2007/0232306 A1 | 10/2007 | Johannesson et al. | |
| 2009/0258647 A1 | 10/2009 | Yamada et al. | |
| 2009/0323697 A1* | 12/2009 | Celentano | H04W 28/06 370/395.42 |
| 2010/0050255 A1* | 2/2010 | Upadhyay | H04L 63/1458 726/22 |
| 2011/0086642 A1* | 4/2011 | Lee et al. | 455/445 |
| 2011/0143712 A1* | 6/2011 | Christensson et al. | 455/410 |
| 2011/0292893 A1* | 12/2011 | Lee | H04W 74/002 370/329 |
| 2012/0087274 A1* | 4/2012 | Meriau | 370/253 |
| 2012/0282956 A1* | 11/2012 | Kim | H04L 12/5895 455/466 |
| 2012/0309419 A1* | 12/2012 | Lee et al. | 455/456.1 |
| 2012/0329485 A1* | 12/2012 | Lee | H04L 1/1607 455/458 |
| 2013/0010768 A1* | 1/2013 | Lee et al. | 370/336 |
| 2013/0017829 A1* | 1/2013 | Kim | H04W 60/06 455/435.1 |

FOREIGN PATENT DOCUMENTS

| | | |
|---|---|---|
| JP | 2008541669 A | 11/2008 |
| JP | 2009171595 A | 7/2009 |
| KR | 10-2008-0015427 A | 2/2008 |
| WO | WO 2006/124840 A1 | 11/2006 |
| WO | WO 2008/135094 A1 | 11/2008 |
| WO | WO 2011/051753 A1 | 5/2011 |
| WO | WO-2011082524 A1 | 7/2011 |
| WO | WO 2011/119680 A2 | 9/2011 |

OTHER PUBLICATIONS

3rd Generation Partnership Project (3GPP), TR 23.888 V0.3.2, "3rd Generation Partnership Project; Technical Specification Group Services and System Aspects; System Improvements for Machine-Type Communications; (Release 10)", Mar. 2010, 33 pages.
3rd Generation Partnership Project (3GPP), TS 22.368, V1.1.1, "3rd Generation Partnership Project; Technical Specification Group Services and System Aspects; Service requirements for machine-type communications; Stage 1 (Release 10)", Nov. 2009, 23 pages.
3rd Generation Partnership Project (3GPP), TS 23.888, V0.1.0, "3rd Generation Partnership Project; Technical Specification Group Services and System Aspects; System Improvements for Machine-Type Communications; (Release 10)", Dec. 2009, 12 pages.
3rd Generation Partnership Project (3GPP), TS 25.331, V9.1.0, "3rd Generation Partnership Project; Technical Specification Group Radio Access Network; Radio Resource Control (RRC); Protocol Specification (Release 9)", Dec. 2009, 1756 pages.
3rd Generation Partnership Project (3GPP), TD S2-101076 , "Network Improvements for Small Data Transmission", Huawei, TSG SA WG2, Meeting #78, San Francisco, USA, Feb. 22-26, 2010, 5 pages.
3rd Generation Partnership Project (3GPP), TD S2-101204, "Online Small Data Transmission", Alcatel-Lucent Shanghai Bell, Alcatel-Lucent, TSG SA WG2, Meeting #78, San Francisco, USA, Feb. 22-26, 2010, 3 pages.

3rd Generation Partnership Project (3GPP), TD S2-101402, "A Solution for Online Small Data Transmission", ETRI, TSG SA WG2, Meeting #78, San Francisco, USA, Feb. 22-26, 2010, 2 pages.
3rd Generation Partnership Project (3GPP), TD S2-101453, "Key Issue—Offline Small Data Transmission", KRN, TSG SA WG2, Meeting #78, San Francisco, USA, Feb. 22-26, 2010, 3 pages.
3rd Generation Partnership Project (3GPP), RP-090991, "New SI proposal: RAN Improvements for Machine-type Communications", Huawei, Alcatel-Lucent, CATR, China Unicom, CMCC, Ericsson, Fujitsu, LG Electronics, Panasonic, Philips, Qualcomm Europe, ST-Ericsson, Telecom Italia, Verizon, ZTE, TSG-RAN, Meeting #45, Sevilla, Spain, Sep. 15-18, 2009, 5 pages.
3rd Generation Partnership Project (3GPP), TS 25.211, V9.0.0, "3rd Generation Partnership Project; Technical Specification Group Radio Access Network; Physical channels and mapping of transport channels onto physical channels (FDD) (Release 9)", Sep. 2009, 56 pages.
3rd Generation Partnership Project (3GPP), TS 25.212, V9.0.0, "3rd Generation Partnership Project; Technical Specification Group Radio Access Network; Multiplexing and channel coding (FDD) (Release 9)", Sep. 2009, 108 pages.
3rd Generation Partnership Project (3GPP), TS 25.213, V9.0.0, "3rd Generation Partnership Project; Technical Specification Group Radio Access Network; Spreading and modulation (FDD) (Release 9)", Sep. 2009, 36 pages.
3rd Generation Partnership Project (3GPP), TS 25.214, V9.0.0, "3rd Generation Partnership Project; Technical Specification Group Radio Access Network; Physical layer procedures (FDD) (Release 9)", Sep. 2009, 95 pages.
3rd Generation Partnership Project (3GPP), TS 25.331, V9.0.0, "3rd Generation Partnership Project; Technical Specification Group Radio Access Network; Radio Resource Control (RRC); Protocol Specification (Release 9)", Sep. 2009, 1710 pages.
3rd Generation Partnership Project (3GPP), TS 36.331, V9.0.0, "3rd Generation Partnership Project; Technical Specification Group Radio Access Network; Evolved Universal Terrestrial Radio Access (E-UTRA) Radio Resource Control (RRC); Protocol specification (Release 9)", Sep. 2009, 213 pages.
3rd Generation Partnership Project (3GPP), R2-101251, "MTC Features, RAN Enhancements and Related Procedures", CMCC, TSG RAN WG2, Meeting #69, San Francisco, USA, Feb. 22-26, 2010, 3 pages.
3rd Generation Partnership Project (3GPP), R3-100309, "Consideration on MTC features", CATT, TSG RAN WG3, Meeting #66bis, Valencia, Spain, Jan. 18-22, 2010, 5 pages.
Catt, "Consideration on MTC features," 3GPP TSG RAN WG2 Meeting #68bis, R2- 100181, Jan. 18-22, 2010.
3rd Generation Partnership Project (3GPP), TD S2-101363, "Two Solutions for Online Small Data Transmission", TSG SA WG2, Meeting #78, San Francisco, USA, Feb. 22-26, 2010, 6 pages.
3rd Generation Partnership Project (3GPP), TD S2-100294, "Solicit-response Signalling Solution for Low Data Usage", TSG SA WG2, Meeting #77, Shenzhen, China, Jan. 18-22, 2010, 2 pages.
3rd Generation Partnership Project (3GPP), TD S2-100097, "Key Issues—Offline Small Data Transmissions", TSG SA WG2, Meeting #77, Shenzhen, China, Jan. 18-22, 2010, 3 pages.
3rd Generation Partnership Project (3GPP), TD S2-097564, "Network Improvements for Low Data Usage", TSG SA WG2, Meeting #76, San Jose Del Cabo, Nov. 16-20, 2009, 3 pages.

\* cited by examiner

```
-- ASN1START

RRCConnectionRequest ::=           SEQUENCE {
    criticalExtensions             CHOICE {
        rrcConnectionRequest-r8        RRCConnectionRequest-r8-IEs,
        criticalExtensionsFuture       SEQUENCE {}
    }
}

RRCConnectionRequest-r8-IEs ::=    SEQUENCE {
    ue-Identity                    InitialUE-Identity,
    establishmentCause             EstablishmentCause,
    MTCdata                        MTCdata,
    spare                          BIT STRING (SIZE (1))
}

InitialUE-Identity ::=             CHOICE {
    s-TMSI                         S-TMSI,
    randomValue                    BIT STRING (SIZE (40))
}

EstablishmentCause ::=             ENUMERATED {
    emergency, highPriorityAccess, mt-Access, mo-
    Signalling, mo-Data, spare3 MTC data
    transmission, spare2, spare1,}

-- ASN1STOP
```

EFFICIENT SIGNALING FOR MACHINE TYPE COMMUNICATION

CROSS REFERENCE TO RELATED APPLICATIONS

This application is the 35 U.S.C. 371 National Stage of Patent Cooperation Treaty Application No. PCT/US2011/029550, filed Mar. 23, 2011, which claims the benefit of U.S. provisional application No. 61/316,596, titled "Methods and Apparatus for Indicating Network Machine Type Communication Capabilities," filed on Mar. 23, 2010; U.S. provisional application No. 61/320,610, titled "Improving Efficiency by Signaling Reduction for MTC Devices," filed on Apr. 2, 2010; and U.S. provisional application No. 61/329,392, titled "Methods of Improving Power Efficiency by Signaling Reduction for MTC Devices," filed on Apr. 29, 2010, the contents of all four applications which are hereby incorporated by reference herein, for all purposes.

BACKGROUND

Machine type communication (MTC) is a form of data communication which involves one or more devices or entities that do not necessarily need human interaction in order to communicate. Metering devices or tracking devices are examples of MTC devices. The capabilities of the MTC devices may vary, and the capabilities of the MTC devices may depend on the requirements of one or more MTC applications.

An MTC application may use services, such as transport and communication services, provided by, for example, a 3GPP access network like GERAN, UTRAN, E-UTRAN, or other systems for end-to-end communication between MTC devices. For example, an MTC application may use the capabilities of a 3GPP system for end-to-end communication between an MTC device and an MTC server. Also for example, an MTC device may use the capabilities of a 3GPP system for end-to-end communication with another MTC device. The particular MTC services or capabilities provided by the respective communication networks may vary.

SUMMARY

Disclosed herein are embodiments for Machine Type Communication (MTC). The techniques disclosed may reduce signaling by transmitting MTC data over control planes and also avoiding a full cycle of connection procedures typically required for transmission. In an example embodiment, MTC data may be directly appended to a control plane message. In addition, in order to reduce the signaling load, a WTRU may autonomously release the connection without being told by the network.

Also disclosed herein are techniques that may indicate a network provider's machine type communication (MTC) capability. One or more of the MTC services may be common to a number of MTC applications. Also, one or more MTC services/capabilities may be specific to the requirements of particular MTC applications. The MTC services or capabilities that may be provided by a respective network operator may be communicated to a WTRU.

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 7 represents a procedure for a RRC Connection Request;

DETAILED DESCRIPTION OF ILLUSTRATIVE EMBODIMENTS

Figure 1A:
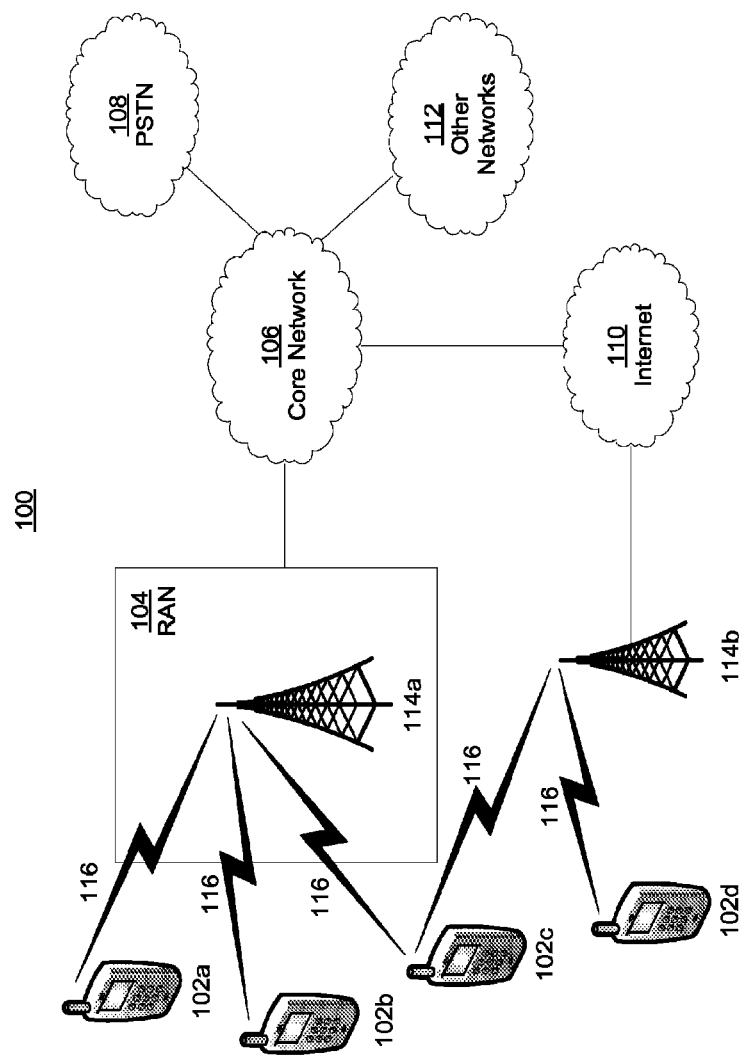
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
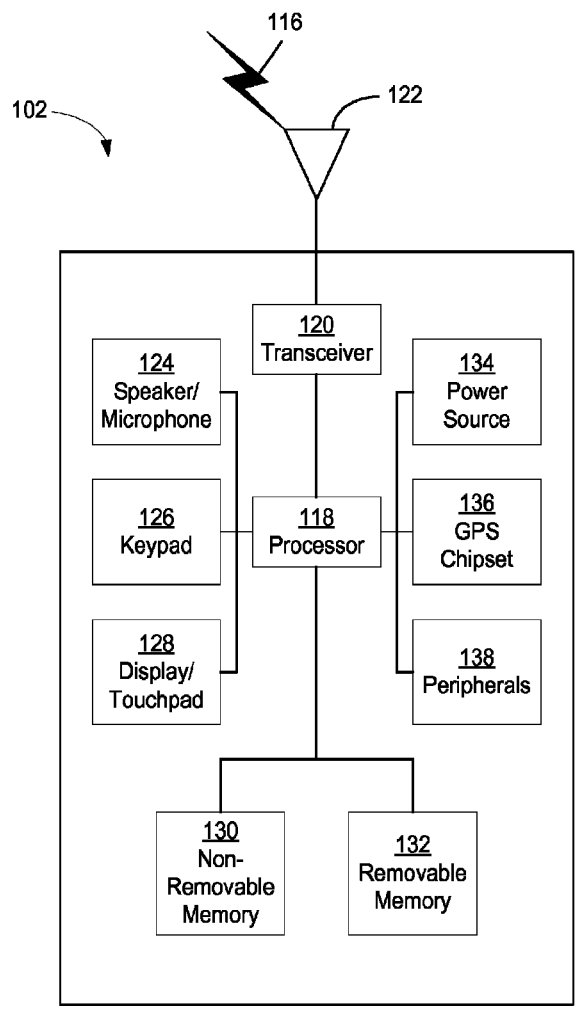
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
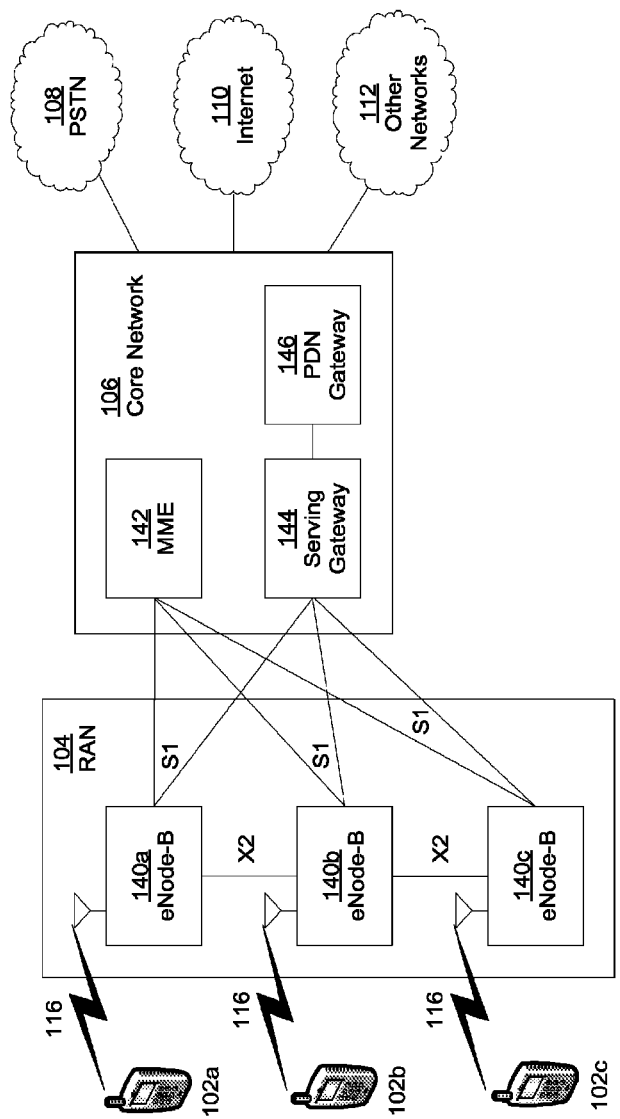
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface. The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
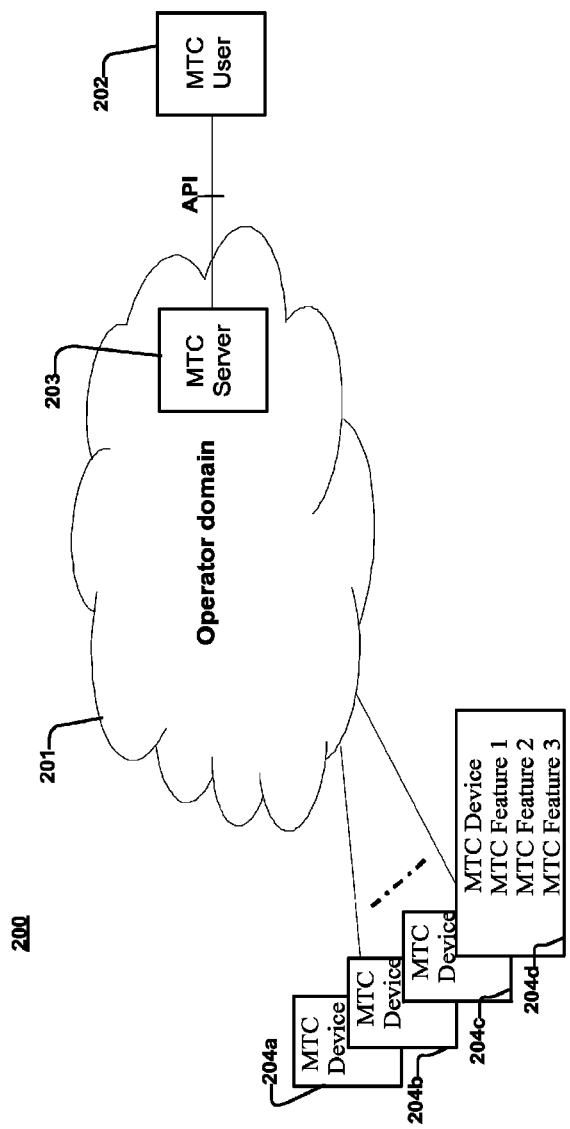
FIG. 2 illustrates an exemplary architecture view of an M2M system that may incorporate techniques for reducing signal overhead and/or power consumption.

FIG. 2 illustrates an architecture view of an M2M system 200 in 3GPP that may incorporate embodiments described herein. The M2M system 200 may be described with respect to a 3GPP network, where 3GPP may provide transport and communication services (including 3GPP bearer services, IMS, and SMS) optimized for the MTC. As defined by 3GPP, Machine Type Communication (MTC) may involve a MTC user 202, a MTC server 203, and MTC devices 204a-204d. The entities shown may be linked through the network operator 201. Thus, the MTC devices may communicate with MTC server 203 (with the MTC server 203 either inside or outside the network operator domain 201). The MTC Devices 204a-204d may connect to the operator domain 201 on the 3GPP network (e.g., UTRAN, E-UTRAN, GERAN, I-WLAN, etc) and communicate via the 3GPP network to a MTC server 203. It is noted that FIG. 2 represents an example architecture, but the architecture is not limited to the specific devices or combination of devices shown; any number or combination of parts may be incorporated.

An end to end application, between the MTC devices 204a-204d and the MTC server 203, may use services provided by a 3GPP system. Each MTC device 204-204d may incorporate features that are network functions optimized for M2M applications. For example, each MTC device 204a-204d may have features, such as MTC Feature 1, MTC Feature 2, and MTC Feature 3 shown associated with device 204d.

The MTC Server 203 may be an entity which connects to the 3GPP network and may be an entity outside of the operator domain 201 or inside an operator domain 201. The MTC server 203 may be an entity that communicates directly with the mobile network and indirectly to MTC devices through the mobile network. The MTC server 203 may also provide an interface to the MTC user 202, the MTC user 202 being a user that uses the services of an M2M server.

MTC applications and MTC devices may not have the same features and/or service requirements. In order for an MTC device to implement the methods described herein an MTC device may need to understand the MTC capabilities a wireless operator may provide.

Among the capabilities that a wireless communication network operator may provide (and a MTC device may have) are capabilities for online and/or offline low data usage (or small data usage), low mobility, time controlled transmission, time tolerant transmission, packet switched (PS) only, mobile originated only, infrequent mobile terminated, MTC monitoring, offline indication, jamming indication, priority alarm message (PAM), extra low power consumption, secure connection, location specific trigger, group based MTC features, group based policing, and/or group based addressing, for example. Depending on the particular MTC capabilities provided by a communication network, users of MTC devices may choose a particular communication network and/or operator. Also, where a communication network may provide particular MTC capabilities, it may be useful for MTC devices to receive an indication as to how to communicate with the network so that the MTC device may utilize the provided MTC capabilities.

Methods and devices are disclosed herein that may indicate a network's MTC capabilities. The MTC capabilities may be indicated to a WTRU (e.g., an MTC capable device). One or more of the MTC capabilities may be common to a number of MTC applications. Also, one or more MTC capabilities may be specific to the requirements of particular MTC applications. The MTC capabilities that may be provided by a respective network may be indicated to a WTRU prior to registration. A WTRU may include one or more configurable elements that may be programmed to implement the disclosed embodiments.

The specific capability requirements for MTC applications may include a requirement for Low Data Usage, which may be classified as "Online Small Data Transmission" or "Offline Small Data Transmission." The MTC feature referred to as "Online Small Data Transmissions" may be used with online or connected MTC devices that may frequently send or receive small amounts of data.

The MTC feature referred to as "Offline Small Data Transmissions" may be used with offline or disconnected MTC devices that may connect, then send and/or receive predefined small amounts of data, and then may disconnect from the communication network. "Offline" or "disconnected" may mean the MTC device may not be reachable by the communication network for MTC signaling or user plane data. To support the Offline Small Data Transmissions MTC feature, a MTC device may efficiently access the communication network, send the data, receive acknowledgement of sent data, and disconnect from the network. For both online and offline small data transfer, the definition of a small amount of data may be configurable on a per subscription basis.

In order to support MTC enhancements, such as the methods mentioned herein, an MTC device may need to be aware of the particular method, service, or capability for transferring online/offline small data that is supported by respective wireless communication networks. Therefore, a mechanism, device, apparatus, and/or method to inform an MTC device of a respective wireless communication network's MTC capabilities related to MTC applications may be useful.

In an embodiment, one or more nodes or devices of a wireless communication network may include one or more configurable elements. The configurable node or device of the wireless communication network may be configured to inform one or more MTC devices of one or more supported MTC capabilities using the procedure to broadcast system information. The information broadcast may pertain to the supported MTC capabilities for MTC or WTRU applications such as, but not limited to online and/or offline low data usage. Information related to supported MTC capabilities may be added to an existing/legacy System Information Block (SIB). Alternatively, in the case of GSM EDGE Radio Access Network (GERAN) access, the information related to the supported MTC capabilities may be added to an existing System Information (SI) message. For example, in FIG. 3, UTRAN 320 may transmit system information to WTRU 310.

In an alternative embodiment, the information related to the supported MTC capabilities may be added to a newly created SIB. Also, in the case of GERAN access, the information related to the supported MTC capabilities may be added to a newly created System Information (SI) message. In the case of a newly created SIB or newly created SI, the SIB or SI may be an MTC-specific SIB or SI and may carry some or all MTC related information. By way of example, a newly created SIB or SI may carry the load information needed to support Time Tolerant Transmissions.

Figure 4:
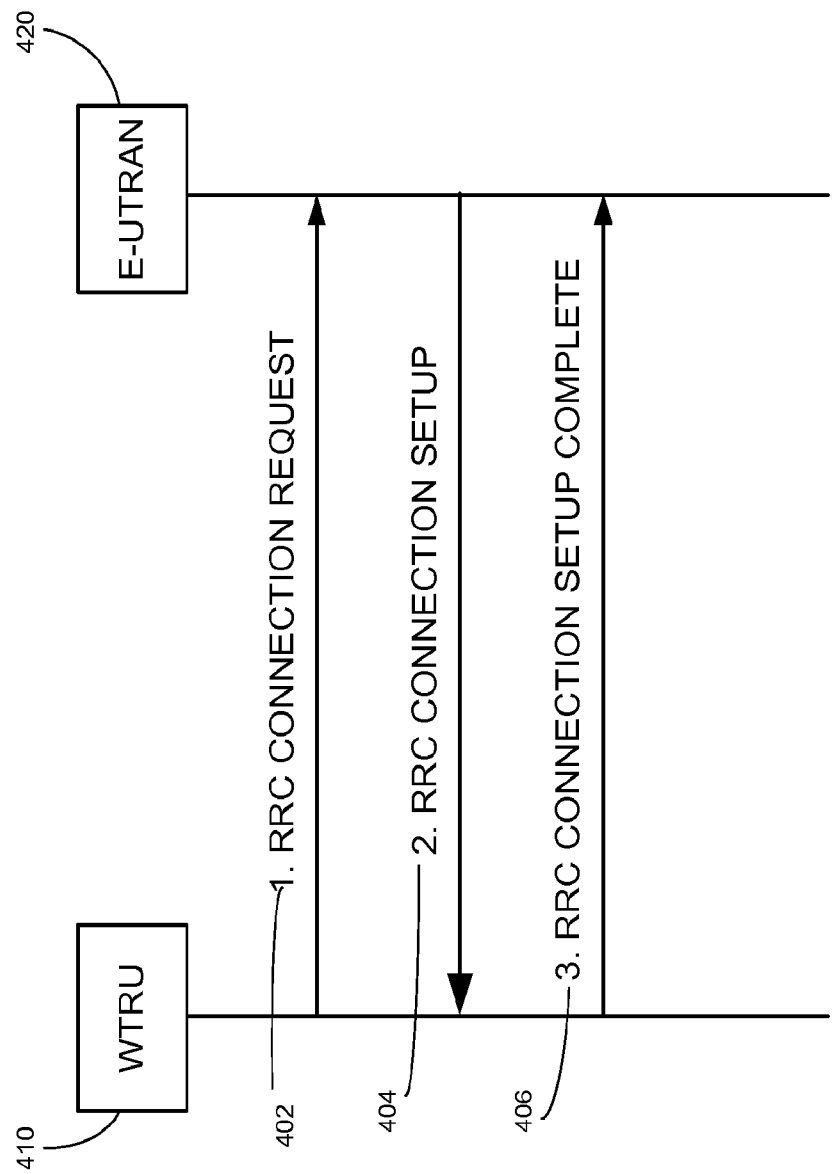
FIG. 4 illustrates an exemplary block diagram of a communication services notification strategy using RRC.

In an embodiment, a Radio Resource Control (RRC) Connection Setup message may be further extended to include information pertaining to supported MTC capabilities for MTC applications, such as but not limited to online and/or offline low data usage. The information in the extended RRC Connection Setup message may be used to indicate to a WTRU, what MTC capabilities are supported by the respective wireless communication networks. FIG. 4 is an exemplary illustration of the signaling that may occur between the WTRU and a E-UTRAN during the RRC Connection Establishment Procedure.

In an embodiment, a WTRU 410 may send an RRC Connection Request 402 that may include an information element (IE) requesting a communication network's capability for an MTC application or feature, such as small data transmission, for example. The RRC Connection Request 402 may include information that the WTRU 410 may be an MTC device or support a capability belonging to a MTC feature, group, etc. In response, the respective communication network, E-UTRAN 420, may send an RRC Connection Setup message 404 that may be modified with a new IE. The new IE may indicate one or more particular methods for transferring data for the specific MTC feature or application, for example. The WTRU 410 may recognize the new IE sent to it and the WTRU 410 may decode information associated with the new IE to assess the network's MTC or other capabilities. For example, the WTRU 410 may determine based on the received IE that the communication network 420 may support piggybacking of data on control plane messages, and if so, the WTRU 410 may encapsulate short data (or small data) in an RRC Connection Setup Complete message 406 using a new IE.

Alternatively, the communication network 420 may send a new IE indicating the one or more particular methods for transferring small data without a explicit request from the WTRU 410 (e.g., the communication network may transmit an IE to some or all WTRUs).

Figure 5:
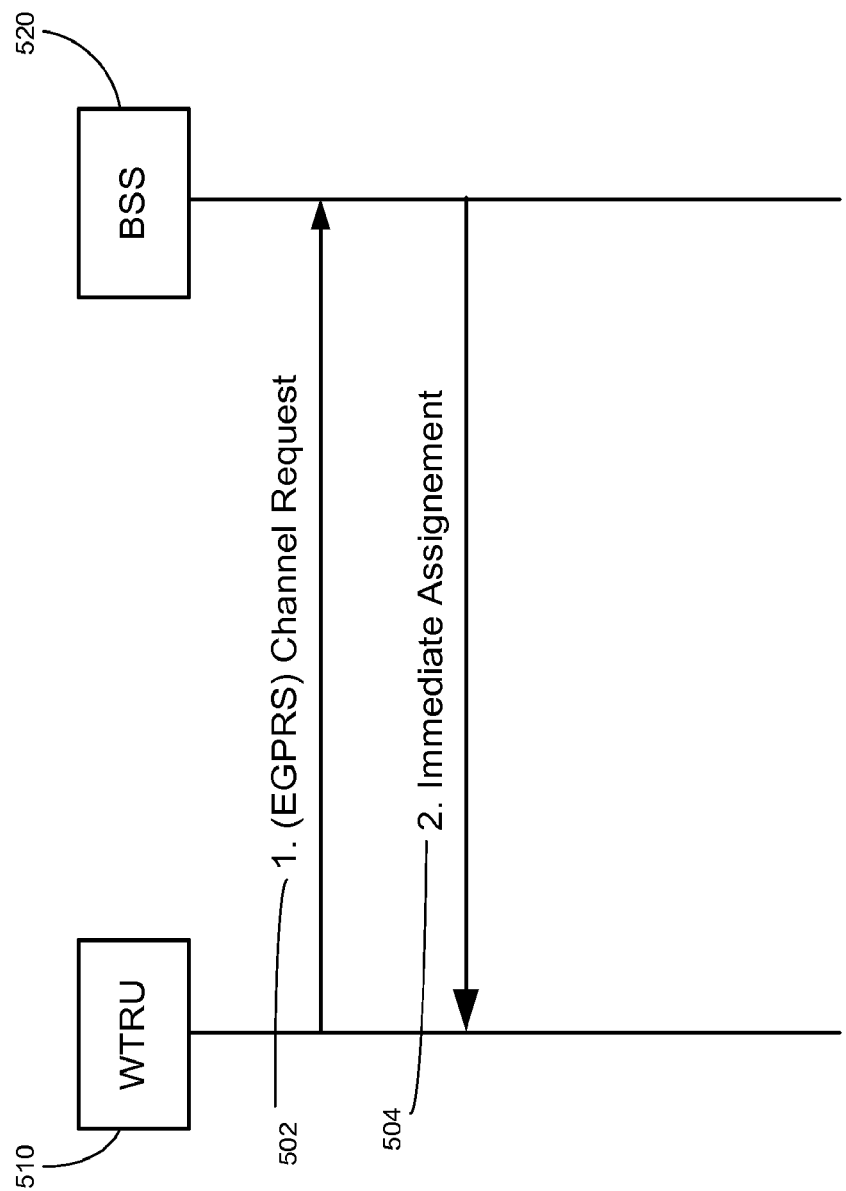
FIG. 5 illustrates an exemplary block diagram of a communication services notification strategy using Immediate Assignment.

In another exemplary embodiment, as illustrated in FIG. 5, a different RRC Signaling Solution may be implemented for a 2G (GERAN Access) Network. FIG. 5 illustrates the signaling that may occur between the Mobile Station/User Equipment/WTRU 510 and a Base Station Substation (BSS) 520 during the RRC Connection Establishment Procedure in GERAN.

An Immediate Assignment (or Immediate Assignment Extended) message may be extended to include the information pertaining to the supported MTC capabilities, such as but not limited to those MTC capabilities for low data usage. The information in an Immediate Assignment message may be used to indicate to a WTRU (i.e., MS/UE) what MTC services or capabilities may be supported by the respective wireless communication network.

For example in FIG. 5, a WTRU 510 may send a Channel Request (or an EGPRS Channel Request) message 502 with an IE requesting the communication network's 520 MTC capabilities, such as for small data transmission. Alternatively, the WTRU 510 may send a Channel Request (or an EGPRS Channel Request) 502 message with information that the WTRU 510 is an MTC device. In response, the communication network and/or BSS 520 may send an Immediate Assignment 504 with a new IE that may indicate one or more particular methods for transferring small data, for example. Alternatively, the communication network and/or the BSS 520 may send the IE indicating the one or more particular methods for transferring small data without the explicit request from the WTRU 510 (i.e., the communication network and/or BSS may transmit the IE to some or all of WTRUs). The WTRU 510 may recognize the IE (or a new IE) and the WTRU 510 may decode information associated with the IE to assess the network's 520 MTC capabilities.

Figure 6A:
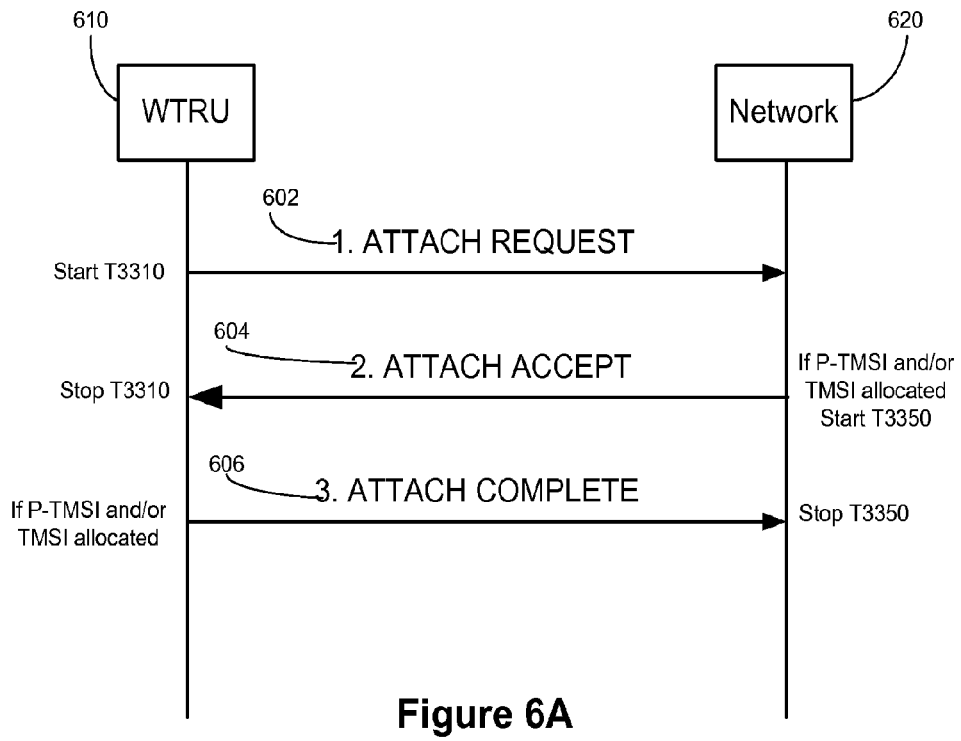
FIG. 6A illustrates an exemplary block diagram of a communication services notification strategy non-access stratum.
Figure 6B:
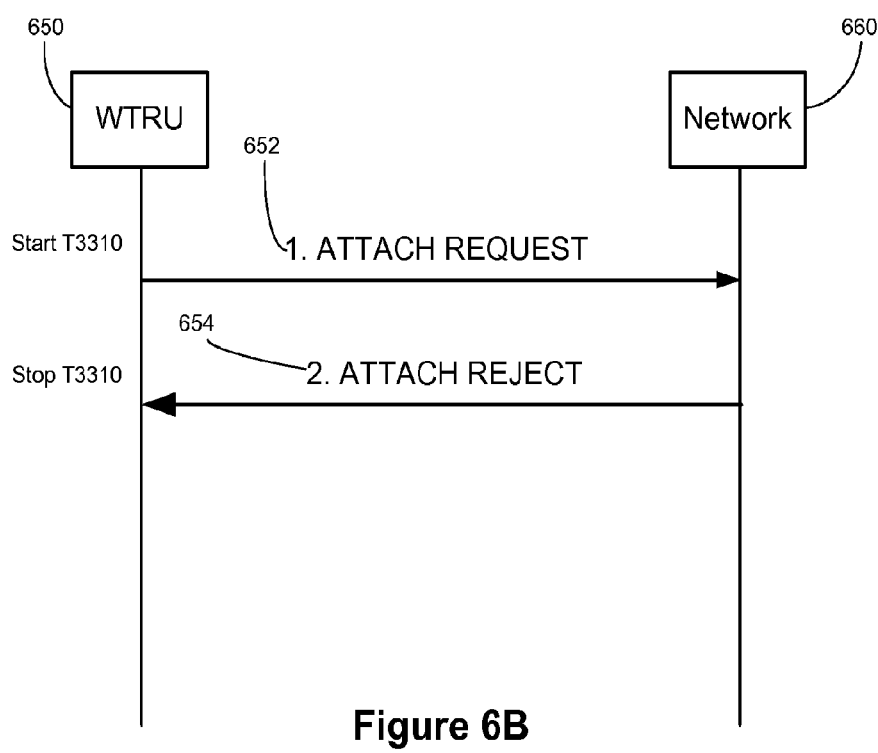
FIG. 6B illustrates an exemplary block diagram of a communication services notification strategy using non-access stratum.

In another embodiment, as shown in the exemplary message exchange in FIGS. 6a and 6b, Non-Access Stratum (NAS) Signaling may be used. A NAS Attach Accept message may be extended to include information pertaining to one or more supported MTC capabilities, such as low data usage. The information may be used to indicate to a WTRU what MTC capabilities may be supported by the respective wireless communication network. For example, as shown in FIG. 6a, the WTRU 610 may send an Attach Request 602 that may include an IE requesting the network 620 MTC capability for small data transmission. Alternatively, the Attach Request 602 may include information that the WTRU 610 is an MTC device.

In response to the Attach Request 602, the communication network 620 may send a modified Attach Accept 604 that may include a new IE indicating one or more particular methods that may be used for transferring small data, for example. Alternatively, the communication network 620 may send a new IE indicating the one or more particular methods for transferring small data without the explicit request from the WTRU 610 (e.g., the communication network may transmit information to some or all of WTRUs).

The WTRU 610 may recognize the new IE and may decode information associated with the new IE to assess the network's 620 MTC capabilities. If the communication network 620 supports piggybacking of data on a NAS message, the WTRU 610 may encapsulate short data in the Attach Complete 606 message using a new IE.

As shown in FIG. 6A, the WTRU 610 may send an Attach Complete message after the Attach Accept 604. If the Offline Small Data Transmissions solutions use the Attach Complete message 606 to carry the MTC data, the MTC device 610 may then add the data to the Attach Complete message 606. In such a case, the MTC device 610 may not necessarily need to store the network's 620 MTC device capability, since it will be communicated in the Attach Accept message 604 that may be sent just prior to the Attach Complete message 606, as shown in FIG. 6A. Also, NAS Attach/Tracking Area Update (TAU)/Routing Area Update (RAU)/Location Update Accept message(s) may also be modified to inform the MTC device that it may use the Attach/TAU/RAU/temporary mobile subscriber identity (TMSI) Reallocation Complete message(s) to send MTC related data.

In an embodiment, as shown in FIG. 6B, if an Attach Request 652 from the WTRU 650 not be successful, an Attach Reject message 654 may be transmitted from the communication network 660. The Attach Reject message 654 may be extended to include MTC capability information.

The Attach procedure described herein may be a registration process conducted in a packet switched (PS) domain. Alternatively, the Attach procedure may not be used if a WTRU is registering in a circuit switched (CS) domain. A registration procedure in the CS domain may be a "Location Update." If the Location Update procedure is the most appropriate procedure to use, that procedure may be consistent with the disclosure regarding the Attach procedure. For example, the WTRU may send a Location Update Request that may include an information element requesting the network MTC capability for small data transmission, for example. In response to the Location Update Request, the communication network may send a modified Location Update Accept that may include a new IE indicating one or more particular methods that may be used for transferring small data, for example. The WTRU may recognize the new IE and may decode information associated with the new IE to assess the network's MTC capabilities.

Alternatively, a WTRU may send a modified Attach Request querying the communication network about the supported MTC capabilities for transferring small data, for example. Also, in response to the modified Attach Request, the communication network may inform the WTRU of the communication network's MTC capabilities on an as needed basis.

In an embodiment, if the MTC device is already registered in the communication network (i.e., the MTC device has gone through the Attach procedure), the MTC device may still perform registration update procedures based on a periodic action or mobility. In such a scenario, the communication network may indicate to the MTC device what MTC services or capabilities may be supported by the communication network when sending the "Accept" message. Examples of "Accept" messages are: TAU ACCEPT, RAU ACCEPT and Location Updating Accept.

In an embodiment, if the Offline Small Data Transmissions MTC solutions use the Attach Request message to carry the MTC data, then the first time the MTC device performs the Attach Procedure on a new communication network, the MTC device may not have knowledge of the communication network's MTC capabilities. In such a situation, the MTC device may not be able to make use of the Attach Request message to carry MTC data. However, the MTC device may use this procedure after the MTC device learns that the communication network supports this procedure. Accordingly, the MTC device may store this information locally in a memory so that it may be used to make a decision as to whether or not the Attach Request may be used to carry MTC data for future data transfer attempts.

Figure 3:
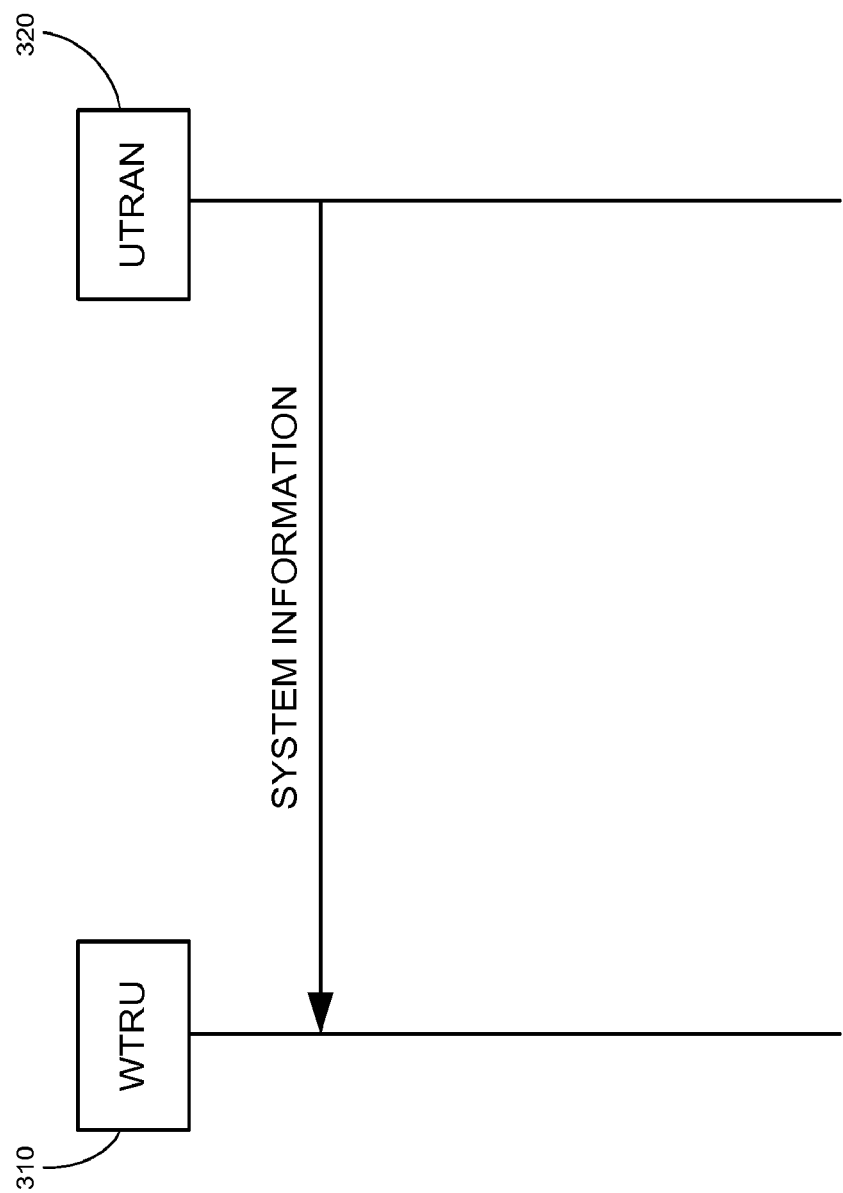
FIG. 3 illustrates an exemplary block diagram of a communication services notification strategy using system information.

In an another embodiment, similar to the embodiment illustrated in FIG. 3, the System Information Blocks/messages (SIB/SI) may be extended to inform the MTC device that the MTC device may be allowed to send MTC related data on the Attach Request message.

A WTRU (e.g., an MTC device) may be in idle mode. The WTRU may wake up and enable a user data transmission if a series of signaling procedures are executed to establish various levels of connections which may be dependent on the non-access stratum (NAS) state (e.g., attached or detached). A legacy message series, in the context of LTE or UMTS, may contain the following: 1) Radio Resource Control (RRC) connection establishment, 2) security activation, 3) data bear establishment, 4) data transmission over the data bearers, 5) data bear release, and 6) RRC connection release.

The legacy methods for a connection requiring the cycle above may cause unnecessary signal overhead in certain scenarios. Mechanisms such as a discontinuous transmission/discontinuous reception (DTX/DRX) in various operation modes and continuous packet connectivity (CPC) features have been employed to address signal overhead. However, these solutions may not be sufficient for many MTC applications and, in particular, for MTC devices that need low power consumption. For example, if ultra-lower power devices remain in power saving states such as idle mode or Cell Paging channel (CELL_PCH)/URA Paging channel (URA_PCH), there may be significant overhead associated to the transmission of data. More specifically, a device in idle mode may have to establish an RRC connection prior to initiating transmission. Furthermore, if the WTRU is detached from the network it may also have to perform NAS registration and additional procedures to be able to transmit these data. For small data transmission or other types of data transmission this may result in a large signal overhead and a very inefficient use of the signal energy.

With the deployment of M2M systems, a wide variety of devices with diverse capabilities may operate under different conditions. In order to differentiate the MTC groups, different sequences and different backoffs may be defined for different groups. It is noted that as part of an effort to optimize the usage of the operator network by addressing various characteristics of M2M, characteristics of MTC devices may be grouped based on MTC features. For example, MTC features may include the following: low mobility; time controlled; time tolerant, packet switched only, online small data transmission, offline small data transmission, mobile originated only, infrequent mobile terminated, MTC monitoring, offline indication, jamming indication, priority alarm message (PAM), extra low power consumption, secure connection, location specific trigger, group based MTC policing, and group based MTC addressing.

Various components of an M2M system may consume power during processing, such as the MTC server, the operator network, MTC device, etc. Signal overhead may cause unnecessary power consumption in a M2M system. For example, unnecessary signal overhead may lead to the power consumption of an MTC device battery. It may be beneficial for MTC devices needing low power or ultra-low power consumption to utilize power more efficiently. An example of an ultra-low power device may be a device that is left unattended for a long period of time, such as months or years. Another example of an ultra-low power device may be a device that transmits small amounts of data or transmits very infrequently.

As expressed herein, t a proposed methodology for reduced overhead and device power saving is to transmit MTC data over control planes (signaling bearers) or to use the control plane message to carry user plane messages. These techniques may enable the devices to avoid having to perform a full cycle of connection procedures, thus reducing delays, signaling overhead, and power consumption.

Although described with certain types of messages, it is understood that the same solutions may be applicable with other existing messages or with new messages. It is noted that even though the terminology used herein may be of UMTS and/or Long Term Evolution (LTE), the concepts herein may be equally applicable to other wireless technologies such as Long Term Evolution-Advanced (LTE-A), Global System for Mobile Communications (GSM) or other wireless technologies, such as GERAN, WiMax, etc. Also, it should be understood that when the Idle mode is mentioned in the context of UMTS it may refer to any of the following RRC states: Idle, CELL_PCH, URA_PCH, or CELL_FACH. Similar idle states to UMTS in other wireless technologies are contemplated. The initiation of the methods described herein may be performed upon determination of network capabilities.

Embodiments may be directed to MTC data transmission via a common control channel (CCCH) or using dedicated control channels (DCCH) signaling bearers. It is contemplated herein that concepts described for CCCH and DCCH may be shared.

With regards to CCCH, when a WTRU is in an idle mode, initialization of data transmission from the WTRU or network may require a radio connection be first established by the RRC connection setup procedure, over which a set of RRC signaling messages may be exchanged between RRC entities of the WTRU and the network. These signaling messages may be designed for passing control and configuration information for RRC connection establishment and may be transmitted over the CCCH logical channel. It is noted that the CCCH is normally considered as part of the control plane.

Using the existing common control signaling, messages may be sent over the CCCH to carry MTC data, thereby avoiding further establishment of data bearers and other signal bearers. This may provide signaling reduction and therefore a reduction in device power consumption. This method may provide a connection procedure which may result in less signaling overhead.

Signaling overhead may be reduced by including or appending MTC data within messages involved in different steps of RRC procedures (such as RRC connection establishment or cell update), but without an RRC connection actually being established. MTC data transmission over RRC messages is described herein for uplink and downlink.

With regards to uplink transmission, the uplink CCCH messages RRC connection request, cell update, and UTRAN registration area (URA) update may be used to carry and transmit MTC data. The transmission may be achieved by appending the data to these messages. For instance for idle mode WTRUs, when MTC data is triggered by higher layers, a RRC connection request procedure may be initiated.

FIG. 7 illustrates a procedure for a RRC Connection Request. As part of this procedure, the UE/WTRU may directly append the data to the RRC Connection Request message, without waiting for the RRC connection to first be established and the data radio bearers be setup. Similarly, for connected mode WTRUs, the data may be appended directly to the CELL_UPDATE message or the URA_UPDATE. By appending the data, the system may optimize the delays and signaling exchange because the WTRU may not need to wait for the CELL_UPDATE confirm.

In order to allow a RRC message (e.g., the RRC connection request) to carry or transmit data to the network, the WTRU may indicate to the network data has been appended to the message. For example, a new RRC establishment cause or cell update or URA update cause may be introduced. For example, this cause may be "MTC data transmission." If a retransmission of the message is taking place, this may be set to "MTC data retransmission."

Table 1 depicts another example embodiment, an MTC data information element (IE) may be used in the RRC message. For example, a new IE may be introduced and included in the RRC message. The content of this IE may include an enumerated IE indicating that there is a "MTC data transmission." The IE may provide additional information that may be used by the network to de-multiplex the MTC data from the RRC message, such as the length/size of the MTC data that is appended. For example, the size may be predefined or configured, wherein a WTRU may not need to indicate anything. In another example, a set of sizes may be defined and the WTRU may indicate an index that corresponds to the size.

TABLE 1

RRC CONNECTION REQUEST

| Information Element/Group name | Need | Multi | Type and reference | Semantics description | Version |
|---|---|---|---|---|---|
| Message Type | MP | | Message Type | | |
| Radio Bearer IEs | | | | | |
| . . . | | | | | |
| UE information elements | | | | | |
| Initial UE identity | MP | | Initial UE identity 10.3.3.15 | | |
| Establishment cause | MP | | "MTC transmission" | | |
| . . . | | | | | |
| Access stratum release indicator | MP | | . . . | | |
| MTC data | OP | | Octets of MTC data | | |

As shown in FIG. 7, for LTE the new cause may be added to the establishment cause 701. The same concept may also be applicable to UMTS. Table 1 and FIG. 7 depict adding the MTC data, but it is understood that this may be captured in other ways. Table 1 shows a MTC data IE may be appended at the end in a RRC CONNECTION REQUEST message in a UMTS system for downlink MTC data transmission.

In an example embodiment, the WTRU may be allowed to use the herein described procedures if the amount of data to transmit is equivalent or lower than a threshold. If the amount of data is above this threshold, the WTRU may add as much data to the message as allowed and may indicate to the network that it has additional data and may also indicate the amount of outstanding data. Alternatively, the WTRU may initiate herein described procedures as many times as it needs to complete transmission of the data. Alternatively, the WTRU may have an option to indicate that it has MTC data to transfer and the amount of data may be provided to the network.

In another embodiment for uplink data transfer, the receiving node in the network entity may not need to decode and understand the MTC message. In order to be able to properly route the data to the desired destination, the WTRU may provide additional information in the RRC message carrying the data. Such information may include the MTC device identity, the destination MTC server identity, subscription information, and the type of data that is being transmitted (e.g., logical channel type), among other things.

The typical manner in which a network response is handled may be modified to function with the disclosed techniques. For example, in order to further optimize the data transmission and reduce signaling overhead, the RRC establishment procedure may be modified such that it does not expect to fully establish the RRC connection even though it initiated a RRC Connection Request. This may be achieved by the WTRU sending a RRC connection request message and not expecting a response.

It is noted that this mechanism does not ensure to the WTRU that the data has been properly acknowledged; however, it may be a mechanism to reduce signaling overhead and may be desired in certain circumstances. For example, if an establishment cause is a MTC Data transmission, the WTRU may submit a RRC connection request message to lower layers for transmission on the uplink CCCH, enter idle mode, and end the procedure. In this example, the WTRU therefore may not start the applicable timers V300 and counter N300. The WTRU may use lower layer increased reliability schemes, such as repetition of the message. Alternatively, the UE may wait to consider the procedure as complete upon confirmation from a lower layer that the message has been transmitted and acknowledged by lower layer hybrid automatic repeat request (HARQ) mechanisms. If lower layers indicate failure, the WTRU may resend the data.

On the network side, if the network receives a WTRU RRC request, it may process the RRC connection request, extract the MTC data, route the data to the corresponding entity/node and not respond to the WTRU.

In another example embodiment of a network response that may reduce signal overhead and provide reliability, a RRC Connection Setup message may be transmitted. The reception of the RRC Connection Setup from a WTRU may act as an implicit acknowledgement with regard to the reception of the MTC data by the network. Although the RRC Connection Setup may be received, to further reduce the signaling the WTRU may not send aa RRC connection setup complete message. An implicit rule may be defined such that if the WTRU sends a request with MTC data, and the WTRU receives the RRC Connection Setup Complete message, it may consider the procedure complete and return to an idle mode (e.g., it may not send a RCC Connection Setup Complete).

In an another embodiment using an RRC Connection Setup message, a indication or IE may be included in the RRC Connection Setup message to explicitly indicate to a WTRU that a RRC Connection Setup message is a response to the original request containing data transfer. Upon reception of this indication the WTRU may terminate the procedure. The RRC Connection Setup may include a new field "MTC acknowledgment" or "MTC data completed". If a "MTC acknowledgment" is included in the RRC Connection Setup message the WTRU may not send an RRC Connection Setup Complete, the WTRU may stop and may reset some or all timers (if applicable), may consider the procedure completed, and it may move back to idle mode. If "MTC acknowledgment" is not included, the WTRU may behave as if a normal RRC Connection Setup was received (i.e., apply the configuration sent by the network and send back an RRC Connection Setup Complete in case of success).

In another example embodiment where a RRC connection setup message is received, the WTRU may respond with a RRC Connection Setup Complete indicating that the message or RRC establishment was due to MTC data transmission or alternatively indicating that it is releasing the connection. However, the WTRU may send the message and move back to idle mode (e.g., releasing the RRC connection), considering the procedure complete.

In another example embodiment of a network response that may reduce signal overhead and provide reliability, a RRC Connection Reject message may be transmitted. The response to the reception of MTC data may be a RRC Connection Reject message. The RRC Connection Reject message response may be expected by the WTRU when sending a RRC Connection Request with MTC data. The reception of a RRC Connection Reject message may act as an implicit acknowledgment that the network successfully received data. The RRC connection reject may specify an "unspecified" rejection cause. Alternatively, a new rejection cause may be added, for example, such as "MTC data completed" or "data acknowledged".

Upon reception of the RRC Connection Reject message, the WTRU may implicitly detect that the reject message is a response to the MTC data transmission or explicitly detect the rejection cause. In either example, the WTRU may consider the procedure successful, move to idle mode, and end the procedure. Thus, the WTRU may not resend the RRC Connection Request message. If the network responds with a RRC Connection Setup, the WTRU may perform the normal procedure and continue with a RRC Connection Establishment.

The concepts for the use of a RRC Connection Reject may also be applicable to the CELL UPDATE/CELL UPDATE CONFIRM/WTRU_RESPONSE_TO_CELL_UPDATE AND URA UPDATE/URA UPDATE CONFIRM/UE_RESPONSE_TO_URA_UPDATE messages.

As described herein, the reception of a response may be an implicit acknowledgment that MTC data has been received. If a RRC response is received then this may imply that the RRC message has been received and therefore the network has acted on it. This may mean that the MTC data appended to this message was also successfully received.

However, in order to deal with additional failure cases on the network side, additional acknowledgement mechanisms may be added which may take many forms. In an example embodiment of an additional acknowledgement mechanism, a RRC Response message may be used to explicitly acknowledge the message. For example, this may be achieved by defining a new cause called "MTC data acknowledgement." For example, for UL data transmission the new cause may be added in the RRC Connection Reject or RRC Connection Request message, setting a "MTC data acknowledgment" in the message. A negative acknowledgement may also be sent to a WTRU, for example, by adding a new cause or field. A negative acknowledgement may be used, for example, when the network cannot identify the server or the WTRU, or for any other reason it may not be able to forward the MTC data.

Alternatively, if the cause is not set to "MTC data acknowledgment," the WTRU may take this as an indication that the network does not support such procedures and may therefore perform a normal RRC connection request procedure. In another alternative for explicit acknowledgement, an IE may be introduced which, for instance, may be called "MTC data ACK" in a RRC message. The "MTC data ACK" IE may indicate acknowledged or non-acknowledged reception of the MTC data.

In another example of an additional acknowledgement, a new message may be defined indicating acknowledgement. In another example of an additional acknowledgement, the acknowledgment of data transfer may be performed by higher layers. Or, if the server does not receive its expected data within a time period, it may poll the WTRU again.

Transmission failure handling is another part of an M2M system that may need modification to implement some of the disclosed power reduction techniques. In an example embodiment, the CCCH messages may use the failure mechanisms used to ensure that data is received on the network side, e.g., the initiation of T300. If no response is received within T300, a WTRU may retransmit the message up to a maximum of N300 times. The WTRU may use MTC specific retransmission and counter values (e.g., T300 and N300 or T302/N302, etc.), or, optionally, use the same values for the RRC connection establishment mechanisms.

T300/T302, etc., as discussed in the examples herein, may be a timer variable that contains a value configured by the network. The timers T300 may be initiated in the WTRU upon the transmissions of a RRC connection request message. The WTRU may wait for a response from a network for T300 time period, if no response is received and the timer expires the WTRU may retransmit the RRC connection request. N300/N302, etc. as discussed in the examples herein, may be a constant (e.g., a variable that contains a value configured by the network) which is used to determine a maximum number of retransmissions of the RRC connection request message.

In an alternate solution for transmission failure handling, a WTRU may be allowed to attempt the RRC-message based transfer procedure just once without introducing any retransmission mechanism at the RRC layer. If a failure is detected (e.g., the timer expires and no response is received) the RRC Connection Request message may be retransmitted using the legacy procedures. More specifically, a new RRC Connection Request message may be triggered without the MTC data appended. The MTC data transfer may be done by using legacy methods.

Figure 8A:
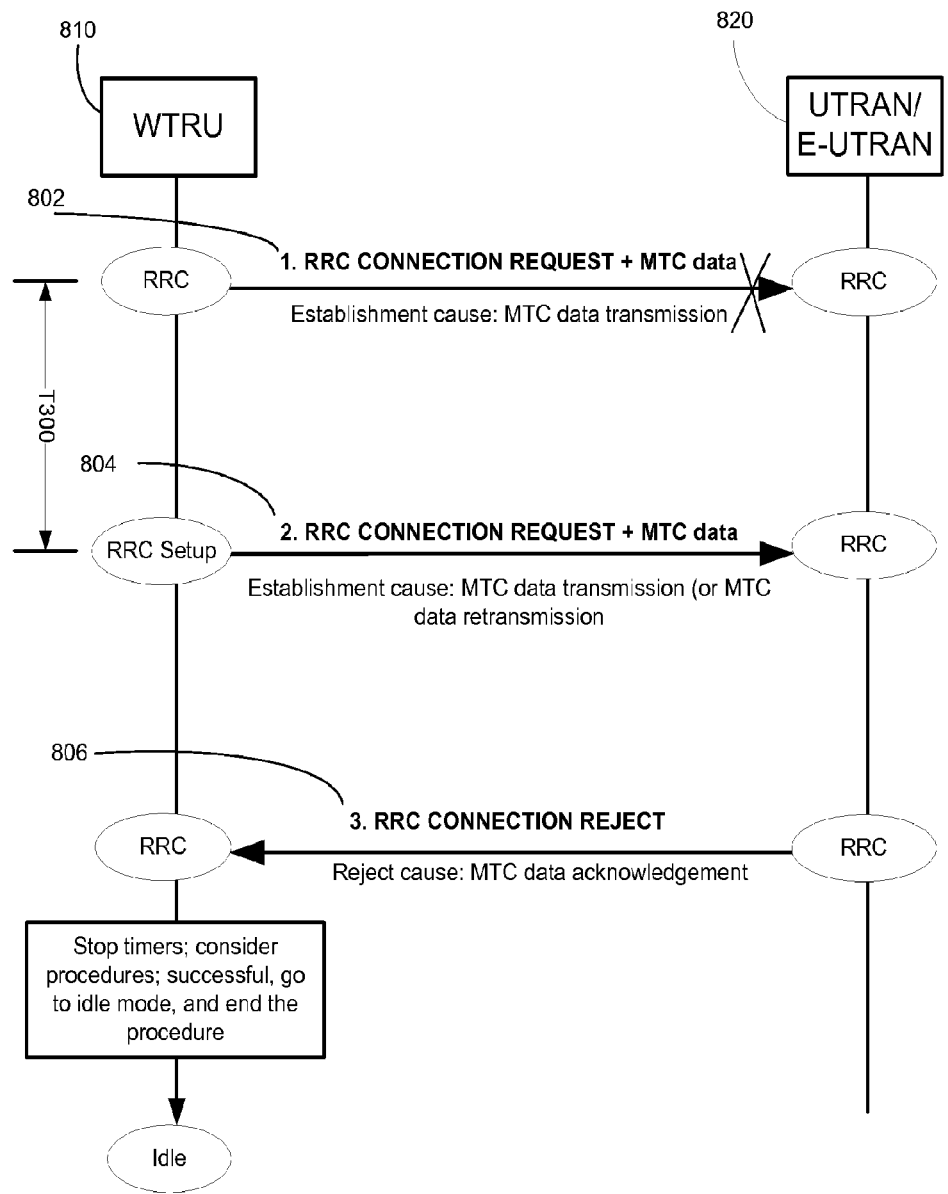
FIG. 8A illustrates an exemplary block diagram of a communication services notification strategy using RRC.
Figure 8B:
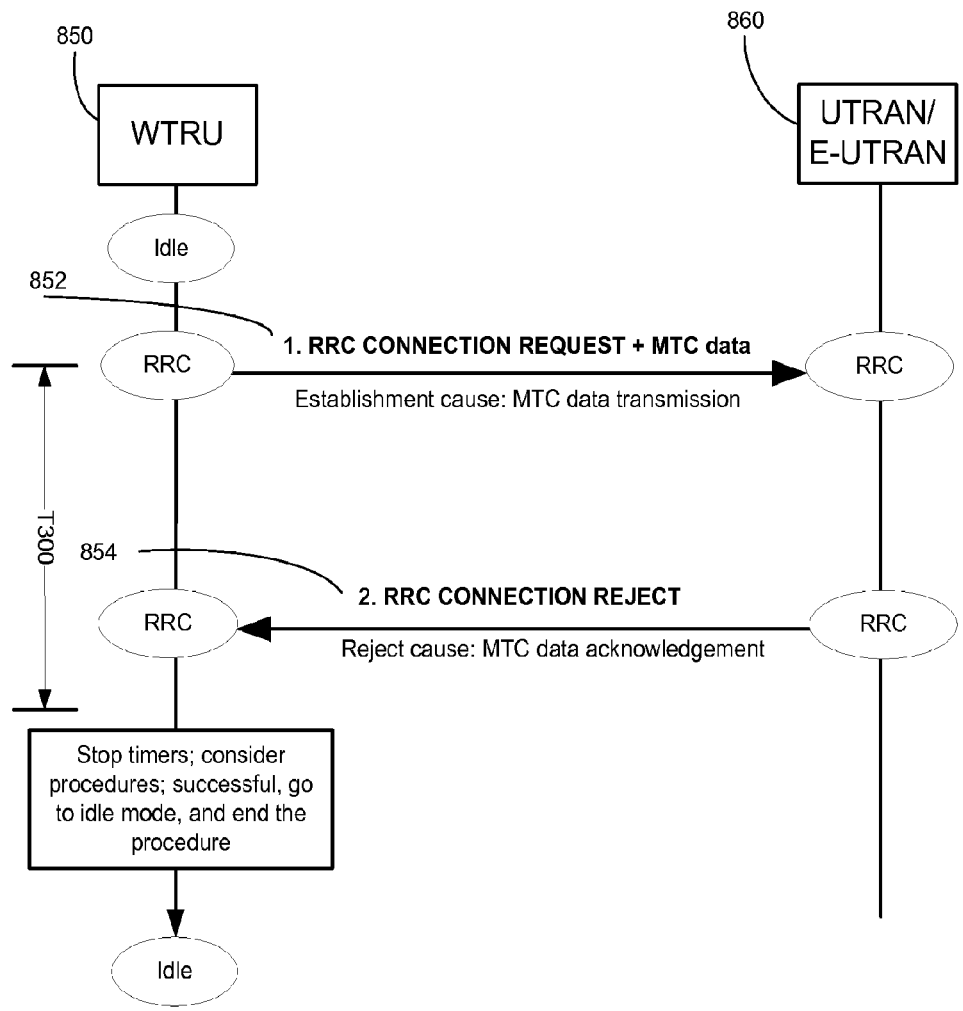
FIG. 8B illustrates an exemplary block diagram of a communication services notification strategy using RRC.

FIGS. 8A and 8B depict exemplary message sequences for uplink data transfer for the disclosed signaling techniques. FIGS. 8A and 8B shows exemplary message sequences of uplink MTC data transmission that may comprise appending the data to the RRC signaling message RRC Connection Request on CCCH, which is an example of the design described herein. The data transmission may be originated by the WTRU which may be originally in IDLE mode or powered off.

In FIG. 8A, a WTRU 810 may initiate a MTC data transmission by sending a RRC Connection Request message at 802. The RRC Connection Request message at 802 may be configured with MTC data appended as part of the message. A ESTABLISHMENT_CAUSE at 802 may be set to a defined value of "MTC data transmission." Following transmission of the RRC Connection Request message, the WTRU 810 may set a counter V300 to 1 and/or start a timer T300. V300 as discussed in the examples herein may be a variable counter used by a WTRU. V300 may be a variable that counts the number of times the RRC connection request message has been transmitted. Once the value of V300 exceeds the maximum number of times the WTRU can retransmit (e.g. N300) the WTRU may enter idle mode.

At 804 a RRC Connection Request message may be sent, this may be because the MTC data transmission at 802 failed. Here, for example, no response was received at WTRU 810 from UTRAN/E-UTRAN 820 by time T300; therefore a RRC Connection Request message at 804 was sent with the same MTC data appended from 802. The ESTABLISHMENT_CAUSE may be set to a newly defined value, for example, "MTC data retransmission" or the same "MTC Data transmission" cause. Further, the WTRU 810 may increment the counter V300 and start another timer T300.

It is possible that the repeated message at 804 may due to consecutive transmission failures. If the counter V300 is greater than a pre-configured value N300 of maximum allowed retransmissions, the WTRU 810 may stop the retransmission and return to IDLE mode.

Upon receiving RRC Connection Request, the UTRAN/E-UTRAN 820 may decide to accept the data transmission. UTRAN/E-UTRAN 820 may decode the MTC data and forward it to an upper layer that reaches an MTC server. Also, the UTRAN/E-UTRAN 820 may respond to the WTRU 810 by sending a RRC Connection Reject message with a defined Rejection cause of "MTC data acknowledgement."

Upon receiving RRC Connection Reject at 806 with Reject cause being set to "MTC data acknowledgement," the WTRU 810 may consider the data transfer as successful and may return to idle mode. Alternatively, the network may, for instance, also have used a RRC Connection Setup as a response instead of a RRC Connection Reject as described above.

In FIG. 8B, a WTRU 850 may initiate a MTC data transmission by sending a RRC Connection Request message at 852 to network 860. The RRC Connection Request message at 852 may be configured with MTC data appended as part of the message. A ESTABLISHMENT_CAUSE at 852 may be set to a defined value of "MTC data transmission." Following transmission of the RRC Connection Request message, the WTRU 850 may set a counter V300 to 1 and/or start a timer T300.

At 854 a RRC Connection Reject message with a Reject cause being set to "MTC data acknowledgement" may be received before the expiration of a timer T300. The WTRU 850 may consider the data transfer as successful and return to idle mode. This example demonstrates the use of an explicit rejection cause. As mentioned herein there may be cases where no explicit new rejection cause is added or the rejection cause is set to a different value such as "MTC Data completed."

Similar to the uplink transmission, for downlink (DL) transmission, it is proposed that some of the RRC messages sent in the DL over the CCCH may be used to carry and transmit the MTC data from the network to a WTRU. These messages may include, for example, RRC Connection Rejection, RRC Connection Setup, Cell_Update Confirm, and URA_Update Confirm.

When MTC data is triggered by higher layers in the DL, for example, a RRC connection request procedure may be initiated. As part of this procedure, the network may directly append the data to the RRC Connection Reject message, without waiting for the RRC connection to first be established.

The network may page WTRU with a cause "MTC data transmission." Upon reception of this paging, the WTRU may initiate a RRC Connection Request to the network, a Cell Update or an URA Update. When the WTRU sends the RRC Connection Request (or cell or URA update) it may indicate a new cause called for example "Waiting for MTC data", or just response to paging.

When a network receives a RRC Connection Request (or cell or URA Update) message, it may append MTC data to a response message (e.g., RRC Connection Reject, cell or URA Update confirm, or RRC Connection Setup message.)

A new cause of RRC Connection Reject may be defined such as "MTC data transmission," or an existing cause may be used such as "unspecified" (and the WTRU may implicitly know that the response is for MTC data). Alternatively an IE may be added to indicate the message is sent for appending MTC data.

The message sent by a network may include one or a combination of IEs. IEs may include the following: an indication that Data is appended to the message; MTC Data; Size of the Data; an indication if one or several messages will be used to send the data; a number of messages that may be sent for a complete transmission of MTC data (e.g., if several message are required); an indication that a message is the last message containing MTC data (e.g., may be called "MTC Data Termination"); an indication if the message is a first transmission or a retransmission; a logical channel type; and a priority for the MTC data.

A WTRU may wait for a RRC Connection Reject, Setup, Cell Update Confirm or URA Update Confirm, as specified herein (i.e., retry to send the request after a certain period of time for up to a maximum number of retries in case it has not received an answer yet). The network may specify different timers and maximum number of retries.

In case of a Cell Update or URA Update, a WTRU may decide to not to release resources when a maximum number of retries has been reached without receiving a confirm message. The WTRU may go back to its previous mode (e.g., idle mode). The procedures described above for failure mechanisms may apply to downlink transfer procedures as well. For example, a WTRU may decide not send additional RRC Connection Request, Cell Update, or URA Update messages, if it does not receive any response message from the network; the WTRU may abort the procedure after a certain period of time and go back to its previous mode. Here, the WTRU may send a message to the network indicating it will not wait for MTC data any longer, or it may not notify the network at all.

A WTRU may implicitly know that a received RRC Connection Reject, Cell Update Confirm, or URA Update Confirm was sent by the network for sending MTC data. The WTRU may be aware because a received message may have included a request for receiving MTC data or the paging message may have had a cause of MTC data. Alternatively, the WTRU may check for an indication of MTC data and/or check whether MTC data is present in the message as defined herein. Upon reception of DL data with MTC data, a WTRU may go back to Idle mode or the previous mode it was in (i.e., it does not try to send the RRC Connection Request on another cell as in the usual procedure in case it received a RRC Connection Reject).

In the case where an acknowledgment may be desired by a network, a WTRU may use the RRC Connection Request message to send the acknowledgment, (e.g., by adding a cause "MTC acknowledgment" as described herein). After sending the acknowledgment to lower layers or after receiving a confirmation from lower layers, the WTRU may return to idle mode and end the procedure.

In a case where a WTRU may receive a RRC Connection Setup, instead of a RRC Connection Reject, the WTRU may respond in a number of ways. In an example embodiment, the WTRU may continue the RRC Connection procedure by sending a RRC Connection Setup Complete. The setup complete may act as an acknowledgement mechanism that the WTRU has received the data. At this point if the cause is MTC Data, the WTRU may send the setup complete and go back to idle mode and end the procedure without moving to a different state. The WTRU may move back to idle once it has confirmed the successful delivery of the RRC message.

In another embodiment, when the WTRU receives a RRC Connection Setup instead of a RRC Connection Reject, the RRC Connection setup message may have an explicit indication that will allow the WTRU to choose whether to perform the full establishment and enter connected mode or move back to idle mode after. In another embodiment, the WTRU may ignore the request from the network and not send back any message. In another embodiment, the WTRU may notify the network that it is ignoring the RRC connection setup message by adding an IE in the RRC Connection Setup Complete or by sending a new type of message, or sending another RRC Connection Request asking for the MTC data again. In case the WTRU needs also to transmit MTC data to the network, it may append the data the RRC Connection Setup Complete it sends to the network (see herein with regard to DCCH for further details). In another embodiment, if the WTRU has uplink data to transfer due to the message received in the DL it may choose to maintain the RRC connection and send an RRC Connection Setup with a legacy response.

In an embodiment, instead of appending the data in an RRC Connection Reject, the network may append MTC data in the RRC Connection Setup. Similar IEs and behavior as described herein for appending the MTC data to the RRC Connection Reject may be used.

In an embodiment, the WTRU may be able to receive RRC Connection Reject, Cell Update Confirm, and URA Update Confirm without having to send any request message to the network, once it has been paged for receiving MTC data. In another embodiment, the network may append the MTC data in a paging message itself. In this case, it may use the same types of IEs defined herein in the paging message. One or several paging messages may be used by the network for transferring MTC data. A WTRU may or may not acknowledge the data in this case. In case of acknowledgement, the WTRU may reuse an existing message like the RRC Connection Request and add an IE just used to acknowledge the data, or use a new message, and not wait for any type of answer from the network (i.e., not wait for a RRC Connection Setup or Reject). When receiving this special type of RRC Connection Request, the network may know that it does not have to start a connection procedure, but rather the request message may be used as an acknowledgement.

With regards to termination behavior, upon confirmation of the status of the MTC transmission at WTRU, successful or not, a WTRU may directly return to idle mode. An exceptional case may be if a WTRU decides to get RRC connection established for a legacy way of data transmission (an option mentioned herein), RRC connection release procedure may be required before the WTRU returns to idle mode.

Additional signaling indicators may be incorporated with the disclosed signaling techniques. To assist MTC data transmission over the RRC messages on CCCH, IEs that define the causes of some RRC messages may include settings for the signaling needs during the MTC data transmission procedure. The IE's may include the following: a PAGING TYPE 1 message, settings of Paging cause may be defined; a RRC CONNECTION REQUEST, settings in Establishment cause IE may be defined; a RRC CONNECTION REJECT, settings in Reject cause IE may be defined; or a CELL UPDATE, settings in Cell update cause IF may be defined The settings may include one or a combination of the following options: "first MTC data transmission" to indicate first MTC data transmission; "MTC data retransmission" to indicate MTC data retransmission; "MTC data acknowledgment" to acknowledge correct reception of MTC data; "DL MTC data transfer request" to request downlink MTC data transfer; "UL MTC data transfer request" to request uplink MTC data transfer; "MTC data reject" to reject further action of MTC data transfer; "MTC data polling" to poll if there is MTC data; or "no MTC data" to respond MTC data polling.

Figure 9:
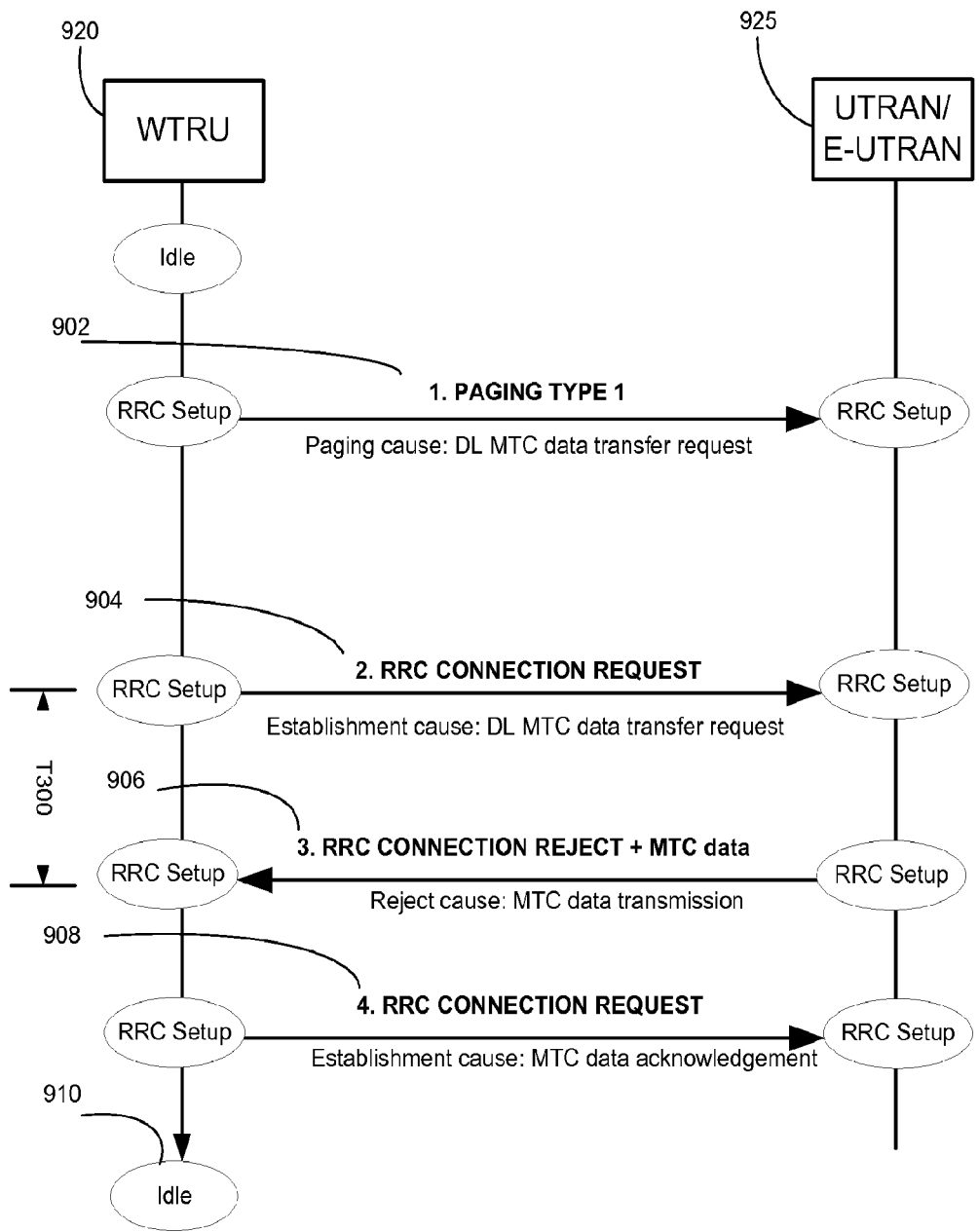
FIG. 9 illustrates an exemplary block diagram of a communication services notification strategy using RRC.

FIG. 9 is an exemplary message sequence for downlink MTC data transmission regarding appending MTC data to a RRC signaling message, RRC Connection Reject on CCCH, as described herein. Another implementation may include having a network send data in the paging message itself, wherein the paging message may be the "paging type 1" RRC message which may be sent to page a UE in a paging channel (PCH). The data transmission may be originated by the network with a paging message.

The cycle of data transfer in downlink may include the following for the RRC Connection reject message. UTRAN/E-UTRAN 925 (e.g., the network) may send a paging message 902 Paging cause set to a defined IE of "DL MTC data transmission request" to a WTRU 920. the WTRU 920 may respond to the paging message 902 by sending a RRC CONNECTION REQUEST 904, which may contain a ESTABLISHMENT_CAUSE set to a defined cause of "DL MTC data transfer request," or to another legacy setting. A RRC CONNECTION REJECT message 906 may be sent from UTRAN 925 with MTC data appended and reject cause set to "MTC data transmission." The WTRU 920 may respond with an acknowledgement by sending another RRC CONNECTION REQUEST 908 with a defined establishment cause of "MTC data acknowledgement." At this point, the WTRU 920 may consider the DL data transmission as complete and enter into idle mode 910. UTRAN/E-UTRAN 925 receives RRC CONNECTION REQUEST 908 with establishment cause set to "MTC data acknowledgement," and may consider the DL data transmission complete.

Alternatively, if UTRAN/E-UTRAN 925 had received a second RRC CONNECTION REQUEST, it may consider the previous MTC data transmission 906 as a failure, and it may start retransmission of MTC data by repeating the transmission similar to sequence 906, except the reject cause may be set to "MTC data retransmission."

Figure 10:
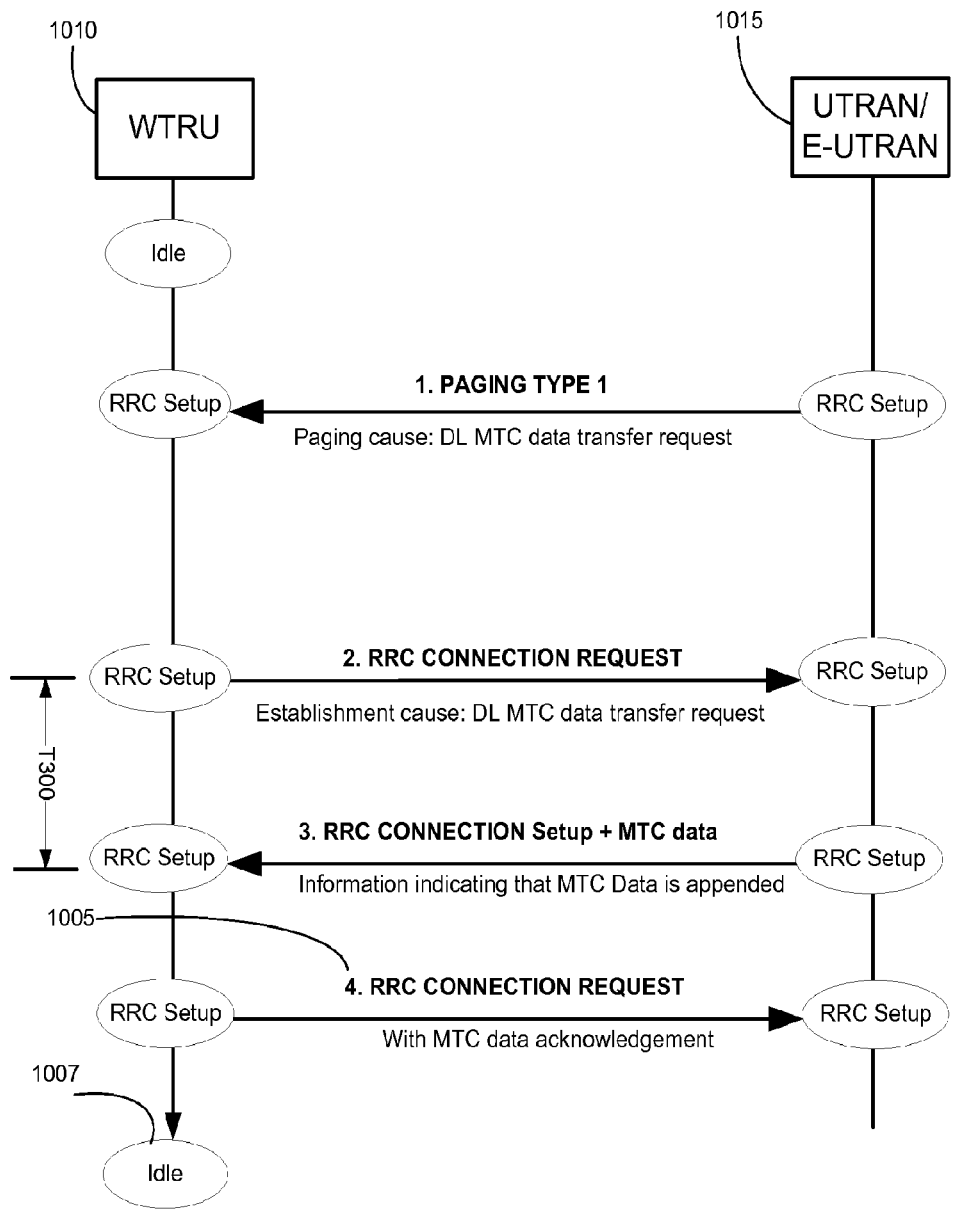
FIG. 10 illustrates an exemplary block diagram of a communication services notification strategy using RRC.

FIG. 10 is an exemplary message sequence where RRC Connection Setup is used to carry MTC data. The sequence is similar to FIG. 9. As shown in FIG. 10, at 1005 a RRC Connection Setup Complete message may be sent from the WTRU 1010 to the UTRAN/E-UTRAN 1015 (i.e., network) to indicate that the MTC data has been successfully received and the WTRU 1010 has ended the data exchange and has returned to idle mode 1007.

Another modification that may support the disclosed signaling techniques may be WTRU initiated downlink data transmission. For example, instead of the WTRU waking up to listen to paging occasions, it may wake up at predefined time intervals (possibly configured by MTC configuration), e.g., for periodic reporting, to poll the network for the need to transmit data to the WTRU.

A WTRU initiated downlink data transmission may be done by the WTRU polling the network using one or a combination of the RRC Connection Request, Cell Update message, or a URA Update message. A new cause may be added to this messages indicating that the WTRU is polling for data. A DL response message may contain the MTC Data, which may be appended and sent to the WTRU using any of the procedures described herein. Alternatively a DL response may be sent indicating that there is no data. For example, a RRC Connection Reject message with a cause "no MTC Data" may be sent. The concept may apply to other DL messages and the procedures described herein are also applicable.

Figure 11:
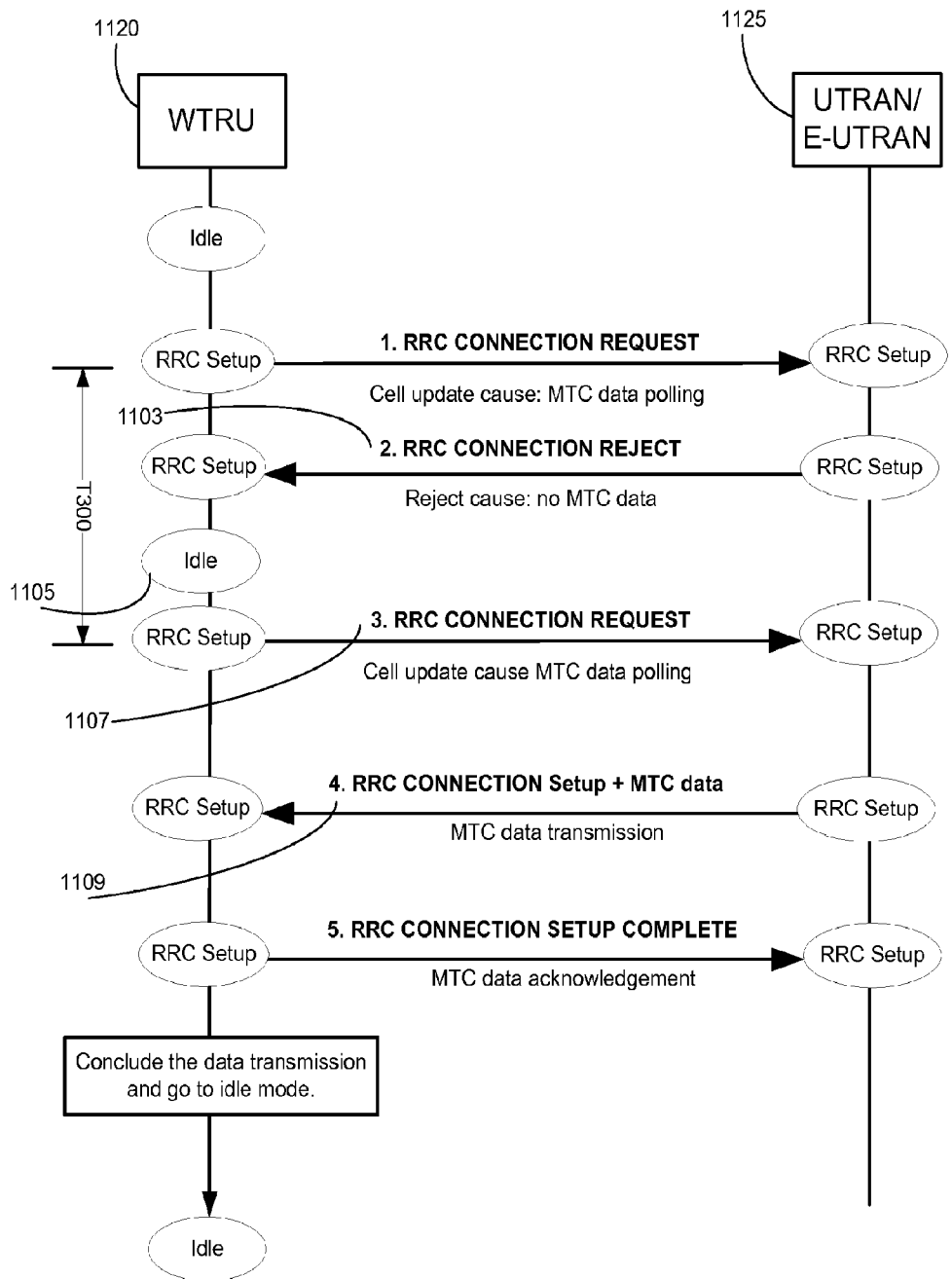
FIG. 11 illustrates an exemplary block diagram of a communication services notification strategy using RRC.

FIG. 11 is an exemplary message sequence of a WTRU initiated DL data transmission. The WTRU 1120 may poll the UTRAN/E-UTRAN 1125 (i.e., the network) with a RRC Connection Request at a predefined time. At 1103, the network 1125 may respond with a RRC Connection Reject message with a cause "no MTC data," which indicates no data is available for transmission. The WTRU 1120 may return back to the idle mode 1105. When a periodic timer expires, the WTRU 1120, at 1107, may poll the network 1125 again. The network 1125 has data to transmit in the DL and may begin transmission of the data at 1109.

Embodiments may also accomplish MTC data transmission using DCCH signaling bearers. Direct Transfer messages may be used for MTC data transmission in uplink and in downlink. Direct Transfer messages may carry encoded NAS messages and may be sent over signaling radio bearers RB3 and RB4 for UMTS and over SRB2 for LTE. The embodiments described herein may be implemented over other radio bearers as well. Additionally, one or several radio bearers may be dedicated to MTC messages. The MTC radio bearer parameters may be broadcast over broadcast control channel (BCCH) in the DL in the system information, configured by the network in an RRC message, or be a default configuration stored in a WTRU.

When a Direct Transfer message containing MTC data is transmitted, a WTRU may have performed the Attach procedure as well as the Authentication and Security procedures. Alternatively, the Direct Transfer messages containing the MTC data may be transmitted without the WTRU being attached and/or without the WTRU having performed the Authentication and Security procedures.

In connected mode, a MTC device may transmit data to the network by sending an Initial Direct Transfer, an Uplink Direct Transfer, or an ULInformationTransfer message. Whenever the network needs to transmit data to an MTC device, it may send a Downlink Direct Transfer or DLInformationTransfer message to the WTRU. One or a combination of the following IEs may be added in the different types of Direct Transfer messages. The IEs may include: an IE indicating that MTC data is present in the message (e.g., Boolean); an IE MTC data (e.g., optional IE); an IE MTC data size; a legacy IE core network (CN) domain identity set to a domain identity MTC service or the CN domain identity may be set to the existing value packet switched (PS); a legacy IE Establishment cause set to value MTC Data Transfer; an IE indicating the identity of the recipient of the MTC data; an IE MTC device identity; or an IE MTC controller identity.

In an embodiment instead of using legacy Direct Transfer messages, one or several new messages may be defined, and may be called, for example, Initial MTC Data Transfer, Uplink MTC Data Transfer, and Downlink MTC Data Transfer. Additionally, other legacy RRC messages used for carrying NAS message may be used as well, for example in LTE RRCConnectionSetupComplete or RRCConnectionReconfiguration.

When the RRC on the WTRU side or the network side receives a Direct Transfer message, the Direct Transfer message may be checked to determine if the message contains MTC data. The determination may be done by checking for an IE indicating the presence of MTC data or by checking for an MTC data IE. The MTC data may be sent to the upper layer in the same signal rather than the signal that may be used to send the NAS message or in a different signal.

In another example embodiment for MTC data transmission using Direct Transfer procedures, the NAS messages themselves may be used for transmitting MTC data instead of just appending the MTC data to the Direct Transfer messages. For example, IEs may be added in existing NAS messages such as Attach Request, Attach Accept, Attach Reject, Attach Complete, Location Area Update/Accept/Reject, and/or Routing Area Update/Accept/Reject. Some NAS messages may be sent periodically by the WTRU like the Location Area Update and the Routing Area Update, and may allow the WTRU to send data to the network without increasing the signaling load. In this embodiment, one or a combination of the IEs described herein for the Direct Transfer messages may be added to the NAS message.

The network may initiate an uplink MTC data transfer by utilizing a PAGING TYPE2 message or another existing message with a new paging cause called for example "MTC data transmission over NAS message" or by using a new message which may be called for example UL MTC Transfer Request.

A MTC device may initiate the downlink MTC data transfer by sending a new message which may be called for example "DL MTC Transfer Request" or by reusing an existing message and adding an IE called for example "MTC data reception request."

MTC data transmission may also be accomplished using a RRC Connection Setup Complete message. MTC data transmission in uplink in DCCH may be achieved by using RRC Connection Setup Complete Message, which may require establishment of a preliminary RRC connection.

A WTRU may initiate the MTC data transmission request by sending a RRC Connection Request message to the network with the establishment cause set to a newly defined cause which may be called for example MTC data transmission request. If the network accepts the request, the WTRU may continue the RRC connection setup procedure as usual by sending a RRC Connection Setup message to the WTRU. The RRC Connection Setup message may include one or a combination of the following IEs: an indication that the MTC data transmission has been granted; a maximum size of the MTC data the WTRU is allowed to send; an indication about how many messages the WTRU can send for appending the MTC data (for example, the WTRU may use several RRC Connection Setup Complete messages instead of one); or an indication that the WTRU may send the next message with the MTC data in case the WTRU needs several messages to send the MTC data.

In case the network decides to reject the MTC data transmission request from a WTRU, it may send a RRC Connection Reject with the reject cause set to a IE which may be called, for example, "MTC data transmission reject." Alternatively, instead of rejecting the connection with a RRC Connection Reject, the network may send a RRC Connection Setup with an IE indicating that the MTC data transmission has been rejected.

When a WTRU receives a RRC Connection Setup message accepting a MTC data transmission request, it may start the MTC data transmission by sending a RRC Connection Setup Complete message with MTC data appended as part of IEs of this message. One or a combination of the following IEs may be added to the RRC Connection Setup Complete message: MTC data or part of the MTC data; size of the MTC data or of the part of the MTC data; total size of the MTC data; number of messages the WTRU needs to send for appending the total MTC data; identity of the recipient, for instance MTC controller the MTC data is dedicated to; or priority of the MTC data.

When a network receives a RRC Connection Setup Complete containing the MTC data, the network may send a RRC Connection Release to a WTRU to release the Connection. This RRC Connection Release may contain an IE indicating that the WTRU has to stop sending MTC data. Alternatively, a network may wait for the number of RRC Connection Setup Complete messages the WTRU needs for sending the complete MTC data before sending the RRC Connection Release. The WTRU may also send another message indicating to the WTRU that it may continue sending RRC Connection Setup Complete messages with MTC data appended. This message may be another RRC Connection Setup with an IE added, another legacy RRC message, or a new message.

When a WTRU receives a RRC Connection Release, it may stop sending MTC data to the network and send a RRC Connection Release Complete, which may contain an IE indicating to the network that the WTRU stopped sending MTC data. Instead of waiting for the RRC Connection Release, the WTRU may autonomously stop sending MTC data and notify the network to interrupt the MTC data transmission by sending a RRC Connection Release Complete, without having received any RRC Connection Release, or by sending another existing RRC message with an IE indicating the interruption of MTC data transmission, or by sending a RRC message which may be called, for example, "MTC Data Transmission Complete."

In order to reduce the signaling load, a WTRU may autonomously release the connection without being told by the network. For example time-controlled devices may autonomously release the connection without being told by the network, where the network and the WTRU know in advance when the WTRU will send and receive data. Different solutions for the autonomous RRC connection release are presented below and may be used independently or combined.

The anticipated duration of the transmission or reception of data may be known in advance. The WTRU may release the connection after the duration has elapsed, wherein the start time may be the time when the transmission or reception began, for example, at the network or the WTRU. In addition, connection release time may be configured to take into account the duration of the transmission (or reception) and a certain time delay. The time delay may be a default value and/or a user or network configurable value.

In an embodiment, the duration may be stored in the WTRU and configured by the network once or regularly. In other words, there may be a default duration stored in the WTRU, but the network may update it via a control message, for example via an RRC message. The WTRU may save this new duration until an updated duration is received.

Furthermore, the duration may be configured by the network during the connection setup phase. There may also be a default configuration to use by the WTRU in this case. The value sent by the network may be reset in the WTRU after each connection is over.

A WTRU may autonomously release the RRC Connection after it is done sending data. In an embodiment, the WTRU may autonomously release the RRC Connection after a period of time has elapsed after the transmission of the last data. In another embodiment, the WTRU may autonomously release the RRC Connection if no uplink (UL) data has been performed for a predefined period of time and no DL data has been received during this period. Data transmission may refer to higher layer data transmission or it may take into account layer 2 (L2) transmissions. The determination of whether no more data is available may be based on the buffer status of the radio link control (RLC). If using RLC acknowledged mode (AM) and unacknowledged data still remains in the buffer, the WTRU may keep the connection. Otherwise, the WTRU may release the connection when the above mentioned criteria are met.

A network may be aware that a WTRU has released the connection with one or a combination of the following methods. In on embodiment, the network may determine the connection is over after a certain timer elapses without receiving any data from the WTRU. In another embodiment, the WTRU may send an indication to the network that it is releasing the RRC Connection using an existing RRC message or a new RRC message. Alternatively, the WTRU may send a L2 indication (e.g., MAC message, in the header or as part of the payload or a special value of the SI) or a L1 signal. In another embodiment, the network may be aware of the amount of data the WTRU is supposed to send, and release the connection after this amount of data has been received. This amount of data may be a default value or may be indicated by the WTRU or the network before the data transmission starts. In order to avoid stalling situations in case the WTRU was not able to send some or all of the data, a timer may be defined defining the maximum duration the transmission may take. When this timer elapses the network may release the connection. This timer may be stopped once the totality of the data has been received by the network.

A network may autonomously release the RRC connection when it is done sending data to a WTRU. The WTRU may determine that the network has terminated the connection after a certain period of time elapses after the WTRU stopped receiving data from the network, wherein the WTRU may release the connection on the WTRU's side. In addition, the connection may terminate if the WTRU also has no uplink data to transmit during a certain period of time.

The network may autonomously release the RRC connection when it is done sending data to the WTRU, wherein the WTRU may know in advance a certain amount of data the network is supposed to send to the WTRU, and the certain amount of data has been received. The amount of data may be a default value or may be configured by the network at the beginning of each data transmission, or for a certain number of data transmissions, or until a reconfiguration occurs. In case the network is not able to send some or all of the data a timer may be defined in the WTRU representing the maximum duration the reception of the data is supposed to take. When this timer expires, even if the WTRU has not received the amount of data it was supposed to, it may autonomously release the connection. Alternatively, when some or all of the data has been received by the WTRU before the timer expires, the timer may stop and the WTRU may autonomously release the connection.

A WTRU may also autonomously detach from the NAS when conditions mentioned herein are met. For example, once the RRC connection is released the WTRU may release the NAS attachment when one or a combination of the following criteria are met: 1) no UL transmissions are performed for a given period of time (e.g., no initiation of RRC Connection requests); 2) no polling messages requesting for information are received for a period of time; 3) no paging messages directed to this WTRU or that cause the WTRU to initiated a RRC connection are received for a period of time; and 4) the time difference between this time and the next scheduled occurrence is greater than a threshold.

It is noted that the techniques disclosed herein may be used for any WTRU. The signaling reductions mentioned herein may lead to reduced power consumption solutions which may be advantageous for low-power consumption devices. It is understood that the concepts herein may be applicable and expandable to many other use cases relating to MTC communications. The techniques disclosed may result in device power saving by transmitting MTC data over control planes. Also disclosed are techniques which may avoid connection procedures typically required for legacy transmission techniques. Some of these concepts may apply for several MTC applications and therefore may apply in an increased number of scenarios.

It is also noted that an MTC device may include a subset of MTC Features. For example, a single MTC device may have the features 1) time tolerant, 2) time controlled, and 3) jamming indication. In the present disclosure, reference to MTC features include the features attributable to a MTC device defined by 3GPP but may also include any other features attributable to an MTC device in a 3GPP network or other features attributable to the MTC device within the context of other wireless networks. The optimal combination of techniques disclosed may depend on the particular features of a specific MTC device. Note the concepts mentioned herein may be applied to WTRUs other than MTC embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer. Note the message naming conventions used in UMTS and LTE specifications may be expressed slightly different. The messaging naming conventions may be self descriptive in the context of their use in particular sections and in the disclosure as a whole, unless otherwise noted. The terms features, capabilities, and services may be used interchangeably herein. The methods herein are applicable to WTRUs that are not necessarily MTC devices.

What is claimed:

1. A method of machine type communication (MTC) for a wireless transmit/control unit (WTRU), the method comprising:
    appending a first indication to a first message, the first indication indicating a capability of the WTRU for MTC small data transfer capability, the MTC small data transfer capability including the capability to send user data via a control plane;
    sending, via a transmitter, the first message to a communication network;
    receiving, via a receiver, a second message from the communication network, the second message including a second indication, the second indication including a capability of the communication network for the MTC small data transfer; and
    sending, via the transmitter, a third message to the communication network, the third message including appended MTC small data, the MTC small data including user data, at least the user data being sent via the control plane.

2. The method of claim 1, wherein the third message is sent without the establishment of data bearers.

3. The method of claim 1, wherein the first message is at least one of: a system information broadcast message, a radio resource control (RRC) connection message, an immediate assignment message, a network access stratum attach request message, a tracking area update request message, a routing area update request message, a location update accept message, or a temporary mobile subscriber identity message.

4. The method of claim 1, wherein the second message is at least one of: a system information broadcast message, a radio resource control (RRC) connection message, an immediate assignment message, a network access stratum attach accept message, a tracking area update accept message, a routing area update request message, a location update accept message, or a temporary mobile subscriber identity message.

5. The method of claim 1, wherein the third message is at least one of: a system information broadcast message, a radio resource control (RRC) connection request message, an immediate assignment message, a network access stratum attach complete message, a tracking area update request message, a routing area update request message, a location update accept message, or a temporary mobile subscriber identity message.

6. A method of communication for a machine type communication (MTC) device, the method comprising:
    sending a first message from the MTC device, the first message including information that the MTC device has an MTC small data transmission capability; and
    receiving a second message at the MTC device in response to the first message, the second message including a capability of a network for the MTC small data transmission, the MTC small data transmission capability including a capability to send user data via a control plane.

7. The method of claim 6, further comprising receiving a page including a cause MTC data transmission.

8. The method of claim 6, wherein the first message is at least one of: a system information broadcast message, a radio resource control (RRC) connection setup request, an immediate assignment message, a network access stratum attach message, a tracking area update message, a routing area update message, a location update accept message, or a temporary mobile subscriber identity message.

9. The method of claim 6, wherein the second message is at least one of: a system information broadcast message, a radio resource control (RRC) connection setup request, an immediate assignment message, a network access stratum attach message, a tracking area update message, a routing area update message, a location update accept message, or a temporary mobile subscriber identity message.

10. A wireless transmit/control unit (WTRU), comprising:
    a processor, the processor configured at least to:
        append a first indication to a first message, the first indication indicating a capability of the WTRU for machine type communication (MTC) small data transfer capability, the MTC small data transfer capability including the capability to send user data via a control plane;
    a transmitter, the transmitter configured at least to:
        send the first message to a communication network; and
    a receiver, the receiver configured at least to:
        receive a second message from the communication network, the second message including a second indication, the second indication including a capability of the communication network for the MTC small data transfer, the transmitter being further configured to:
        send a third message to the communication network, the third message including appended MTC small data, the MTC small data including user data, at least the user data being sent via the control plane.

11. The WTRU of claim 10, wherein the transmitter is further configured such that the third message is sent without the establishment of data bearers.

12. The WTRU of claim 10, wherein the processor is further configured such that the first message is at least one of: a system information broadcast message, a radio resource control (RRC) connection message, an immediate assignment message, a network access stratum attach request message, a tracking area update request message, a routing area update request message, a location update accept message, or a temporary mobile sub scriber identity message.

13. The WTRU of claim 10, wherein the second message is at least one of: a system information broadcast message, a radio resource control (RRC) connection message, an immediate assignment message, a network access stratum attach accept message, a tracking area update accept message, a routing area update request message, a location update accept message, or a temporary mobile subscriber identity message.

14. The WTRU of claim 10, wherein the transmitter is further configured such that the third message is at least one of: a system information broadcast message, a radio resource control (RRC) connection request message, an immediate assignment message, a network access stratum attach complete message, a tracking area update request message, a routing area update request message, a location update accept message, or a temporary mobile subscriber identity message.

* * * * *